United States Patent
Hung et al.

(10) Patent No.: US 11,327,932 B2
(45) Date of Patent: May 10, 2022

(54) AUTONOMOUS MULTITENANT DATABASE CLOUD SERVICE FRAMEWORK

(71) Applicant: Oracle International Corporation, Redwood Shores, CA (US)

(72) Inventors: Hochak Hung, Foster City, CA (US); Kumar Rajamani, San Ramon, CA (US); Sanket Jain, Sunnyvale, CA (US); Giridhar Ravipati, Foster City, CA (US); Jaebock Lee, Sunnyvale, CA (US); Alexander Chen, Millbrae, CA (US); Jen-Cheng Huang, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 511 days.

(21) Appl. No.: 16/055,468

(22) Filed: Aug. 6, 2018

(65) Prior Publication Data

US 2019/0102384 A1    Apr. 4, 2019

Related U.S. Application Data

(60) Provisional application No. 62/566,358, filed on Sep. 30, 2017.

(51) Int. Cl.
*G06F 16/21*    (2019.01)
*G06F 9/50*    (2006.01)
(Continued)

(52) U.S. Cl.
CPC ........ *G06F 16/214* (2019.01); *G06F 9/45558* (2013.01); *G06F 9/4843* (2013.01);
(Continued)

(58) Field of Classification Search
CPC ........ G06F 16/27; G06F 9/505; G06F 16/214; G06F 2009/4557
See application file for complete search history.

(56) References Cited

U.S. PATENT DOCUMENTS

| 4,769,772 A | 9/1988 | Dwyer |
| 4,803,614 A | 2/1989 | Banba et al. |
(Continued)

FOREIGN PATENT DOCUMENTS

CN    104951425 A    9/2015

OTHER PUBLICATIONS

Agrawal et al. ("Oracle Database Administrator's Guide 12c Release 1 (12.1), Aug. 2014") (Year: 2014).*
(Continued)

*Primary Examiner* — Debbie M Le
*Assistant Examiner* — Ken Hoang
(74) *Attorney, Agent, or Firm* — Hickman Becker Bingham Ledesma LLP; Brian N. Miller

(57) ABSTRACT

Provided herein are workload management techniques that asynchronously configure pluggable databases within a compute cloud. In an embodiment, the compute cloud receives an administrative request that indicates configuration details for a pluggable database. The compute cloud generates a configuration descriptor that specifies an asynchronous job based on the configuration details of the request. The compute cloud accesses hosting metadata to detect at least one of: a) a current container database that already hosts the pluggable database, b) a target container database that will host the pluggable database, or c) a particular computer that hosts at least one of: the current container database, or the target container database. The compute cloud executes the asynchronous job to configure the pluggable database based on at least one of: the hosting
(Continued)

metadata, or the configuration descriptor. Thread pools, lanes, and queues may facilitate load balancing to avoid priority inversion, starvation, and denial of service.

35 Claims, 9 Drawing Sheets

(51) Int. Cl.
  *G06F 16/27* (2019.01)
  *G06F 9/455* (2018.01)
  *G06F 9/48* (2006.01)

(52) U.S. Cl.
  CPC ............ *G06F 9/505* (2013.01); *G06F 9/5077* (2013.01); *G06F 9/5088* (2013.01); *G06F 16/27* (2019.01); *G06F 2009/4557* (2013.01); *G06F 2009/45562* (2013.01)

(56) References Cited

U.S. PATENT DOCUMENTS

| | | |
|---|---|---|
| 4,829,427 A | 5/1989 | Green |
| 4,956,774 A | 9/1990 | Shibamiya et al. |
| 5,091,852 A | 2/1992 | Tsuchida et al. |
| 5,251,131 A | 10/1993 | Masand et al. |
| 5,287,459 A | 2/1994 | Gniewek |
| 5,301,317 A | 4/1994 | Lohman et al. |
| 5,315,580 A | 5/1994 | Phaal |
| 5,325,525 A | 6/1994 | Shan et al. |
| 5,339,429 A | 8/1994 | Tanaka et al. |
| 5,379,424 A | 1/1995 | Morimoto et al. |
| 5,412,804 A | 5/1995 | Krishna |
| 5,412,806 A | 5/1995 | Du et al. |
| 5,444,820 A | 8/1995 | Tzes et al. |
| 5,452,468 A | 9/1995 | Peterson |
| 5,459,837 A | 10/1995 | Caccavale |
| 5,469,560 A | 11/1995 | Beglin |
| 5,495,419 A | 2/1996 | Rostoker et al. |
| 5,504,894 A | 4/1996 | Fegurson et al. |
| 5,537,588 A | 7/1996 | Engelmann et al. |
| 5,551,027 A | 8/1996 | Choy et al. |
| 5,572,640 A | 11/1996 | Schettler |
| 5,574,900 A | 11/1996 | Huang et al. |
| 5,590,319 A | 12/1996 | Cohen et al. |
| 5,642,515 A | 6/1997 | Jones et al. |
| 5,671,403 A | 9/1997 | Shekita et al. |
| 5,675,791 A | 10/1997 | Bhide et al. |
| 5,680,547 A | 10/1997 | Chang |
| 5,694,591 A | 12/1997 | Du et al. |
| 5,710,915 A | 1/1998 | McElhiney |
| 5,761,654 A | 6/1998 | Tow |
| 5,764,912 A | 6/1998 | Rosborough |
| 5,765,150 A | 6/1998 | Burrows |
| 5,787,251 A | 7/1998 | Hamilton et al. |
| 5,794,227 A | 8/1998 | Brown |
| 5,797,136 A | 8/1998 | Boyer et al. |
| 5,822,748 A | 10/1998 | Cohen et al. |
| 5,852,820 A | 12/1998 | Burrows |
| 5,857,180 A | 1/1999 | Hallmark et al. |
| 5,860,069 A | 1/1999 | Wright |
| 5,875,445 A | 2/1999 | Antonshenkov |
| 5,918,225 A | 6/1999 | White et al. |
| 6,002,669 A | 12/1999 | White |
| 6,003,022 A | 12/1999 | Eberhard et al. |
| 6,009,265 A | 12/1999 | Huang et al. |
| 6,026,390 A | 2/2000 | Ross et al. |
| 6,026,391 A | 2/2000 | Osborn et al. |
| 6,026,394 A | 2/2000 | Tsuchida et al. |
| 6,061,676 A | 5/2000 | Srivastava et al. |
| 6,205,451 B1 | 3/2001 | Norcott et al. |
| 6,289,335 B1 | 9/2001 | Downing et al. |
| 6,298,342 B1 | 10/2001 | Graefe et al. |
| 6,334,128 B1 | 12/2001 | Norcott et al. |
| 6,339,768 B1 | 1/2002 | Leung et al. |
| 6,353,826 B1 | 3/2002 | Seputis |
| 6,356,889 B1 | 3/2002 | Lohman et al. |
| 6,356,891 B1 | 3/2002 | Agrawal et al. |
| 6,370,524 B1 | 4/2002 | Witkowski |
| 6,430,550 B1 | 8/2002 | Leo et al. |
| 6,438,558 B1 | 8/2002 | Stegelmann |
| 6,438,562 B1 | 8/2002 | Gupta et al. |
| 6,526,526 B1 | 2/2003 | Dong et al. |
| 6,529,896 B1 | 3/2003 | Leung et al. |
| 6,529,901 B1 | 3/2003 | Chaudhuri et al. |
| 6,598,038 B1 | 7/2003 | Guay et al. |
| 6,615,222 B2 | 9/2003 | Hornibrook et al. |
| 6,684,203 B1 | 1/2004 | Waddington et al. |
| 6,694,306 B1 | 2/2004 | Nishizawa et al. |
| 6,807,546 B2 | 10/2004 | Young-Lai |
| 6,901,405 B1 | 5/2005 | McCrady et al. |
| 6,934,699 B1 | 8/2005 | Haas et al. |
| 6,941,360 B1 | 9/2005 | Srivastava et al. |
| 6,954,776 B1 | 10/2005 | Cruanes et al. |
| 6,961,729 B1 | 11/2005 | Toohey et al. |
| 6,980,988 B1 | 12/2005 | Demers et al. |
| 6,983,295 B1 | 1/2006 | Hart |
| 6,990,503 B1 | 1/2006 | Luo et al. |
| 7,007,007 B2 | 2/2006 | Slutz |
| 7,089,225 B2 | 8/2006 | Li et al. |
| 7,139,749 B2 | 11/2006 | Bossman et al. |
| 7,155,428 B1 | 12/2006 | Brown et al. |
| 7,155,459 B2 | 12/2006 | Chaudhuri et al. |
| 7,185,000 B1 | 2/2007 | Brown et al. |
| 7,194,452 B2 | 3/2007 | Galindo-Legaria et al. |
| 7,246,108 B2 | 7/2007 | Ahmed |
| 7,272,600 B1 * | 9/2007 | Singh ................ G06F 9/541 707/999.01 |
| 7,305,410 B2 | 12/2007 | Skopec et al. |
| 7,337,169 B2 | 2/2008 | Galindo-Legaria et al. |
| 7,366,713 B2 | 4/2008 | Kaluskar |
| 7,383,247 B2 | 6/2008 | Li et al. |
| 7,406,477 B2 | 7/2008 | Farrar et al. |
| 7,406,515 B1 | 7/2008 | Joyce |
| 7,499,907 B2 | 3/2009 | Brown et al. |
| 7,526,508 B2 | 4/2009 | Tan et al. |
| 7,634,477 B2 | 12/2009 | Hinshaw |
| 7,647,293 B2 | 1/2010 | Brown et al. |
| 7,664,730 B2 | 2/2010 | Ziauddin et al. |
| 7,747,606 B2 | 6/2010 | Dageville et al. |
| 7,805,411 B2 | 9/2010 | Ziauddin et al. |
| 7,890,491 B1 | 2/2011 | Simmen |
| 7,966,313 B2 | 6/2011 | Bruno et al. |
| 7,970,755 B2 | 6/2011 | Belknap et al. |
| 8,019,750 B2 | 9/2011 | Kosciusko et al. |
| 8,180,762 B2 | 5/2012 | Steinbach et al. |
| 8,335,767 B2 | 12/2012 | Das et al. |
| 8,386,450 B2 | 2/2013 | Simmen |
| 8,554,762 B1 | 10/2013 | O'Neill |
| 8,805,849 B1 | 8/2014 | Christensen |
| 9,280,591 B1 | 3/2016 | Kharatishvili |
| 9,390,120 B1 | 7/2016 | Gulliver |
| 9,507,843 B1 | 11/2016 | Madhavarapu |
| 9,684,561 B1 | 6/2017 | Yan |
| 9,817,836 B2 | 11/2017 | Zha |
| 9,940,203 B1 | 4/2018 | Ghatnekar |
| 10,063,651 B2 * | 8/2018 | Carter ................ G06F 3/0613 |
| 10,348,565 B2 | 7/2019 | Kannan et al. |
| 10,374,809 B1 * | 8/2019 | Dasarakothapalli ....................... H04L 9/3268 |
| 2001/0047372 A1 | 11/2001 | Gorelik et al. |
| 2002/0038313 A1 | 3/2002 | Klein et al. |
| 2002/0099521 A1 | 7/2002 | Yang et al. |
| 2002/0138376 A1 | 9/2002 | Hinkle |
| 2002/0188600 A1 | 12/2002 | Lindsay et al. |
| 2003/0033291 A1 | 2/2003 | Harris |
| 2003/0065644 A1 | 4/2003 | Horman et al. |
| 2003/0088541 A1 | 5/2003 | Zilio et al. |
| 2003/0093408 A1 | 5/2003 | Brown et al. |
| 2003/0115212 A1 | 6/2003 | Hornibrook et al. |
| 2003/0135480 A1 | 7/2003 | Van Arsdale et al. |
| 2003/0154236 A1 | 8/2003 | Dar |
| 2003/0159136 A1 | 8/2003 | Huang et al. |
| 2003/0182276 A1 | 9/2003 | Bossman et al. |

(56) References Cited

U.S. PATENT DOCUMENTS

| | | |
|---|---|---|
| 2003/0212647 A1 | 11/2003 | Bangel et al. |
| 2003/0212668 A1 | 11/2003 | Hinshaw et al. |
| 2003/0229639 A1 | 12/2003 | Carlson et al. |
| 2004/0002996 A1 | 1/2004 | Bischof |
| 2004/0003004 A1 | 1/2004 | Chaudhuri et al. |
| 2004/0015600 A1 | 1/2004 | Tiwary et al. |
| 2004/0024888 A1 | 2/2004 | Davis |
| 2004/0181521 A1 | 9/2004 | Simmen |
| 2004/0186826 A1 | 9/2004 | Choi |
| 2004/0205062 A1 | 10/2004 | Brown et al. |
| 2004/0220911 A1 | 11/2004 | Zuzarte et al. |
| 2004/0244031 A1 | 12/2004 | Martinez |
| 2005/0028134 A1 | 2/2005 | Zane et al. |
| 2005/0038831 A1 | 2/2005 | Souder et al. |
| 2005/0055382 A1 | 3/2005 | Ferrat et al. |
| 2005/0086195 A1 | 4/2005 | Tan et al. |
| 2005/0120000 A1 | 6/2005 | Ziauddin et al. |
| 2005/0125393 A1 | 6/2005 | Yagoub et al. |
| 2005/0125427 A1 | 6/2005 | Dageville et al. |
| 2005/0125452 A1 | 6/2005 | Ziauddin et al. |
| 2005/0138015 A1 | 6/2005 | Dageville et al. |
| 2005/0165741 A1 | 7/2005 | Gordon |
| 2005/0177557 A1 | 8/2005 | Ziauddin et al. |
| 2005/0177971 A1 | 8/2005 | Porco |
| 2005/0187917 A1 | 8/2005 | Lawande et al. |
| 2005/0187971 A1 | 8/2005 | Hassan et al. |
| 2005/0198013 A1 | 9/2005 | Cunningham et al. |
| 2005/0203933 A1 | 9/2005 | Chaudhuri et al. |
| 2005/0203940 A1 | 9/2005 | Farrar et al. |
| 2005/0234965 A1 | 10/2005 | Rozenshtein et al. |
| 2005/0262060 A1 | 11/2005 | Rohwedder et al. |
| 2005/0278357 A1 | 12/2005 | Brown et al. |
| 2005/0278577 A1 | 12/2005 | Doong et al. |
| 2005/0283458 A1 | 12/2005 | Galindo-Legaria et al. |
| 2005/0283471 A1 | 12/2005 | Rafi |
| 2005/0283478 A1 | 12/2005 | Choi |
| 2006/0026115 A1 | 2/2006 | Ahmed |
| 2006/0026133 A1 | 2/2006 | Ahmed |
| 2006/0031200 A1 | 2/2006 | Santosuosso |
| 2006/0036989 A1 | 2/2006 | Chaudhuri et al. |
| 2006/0041537 A1 | 2/2006 | Rafi |
| 2006/0047626 A1 | 3/2006 | Raheem |
| 2006/0085378 A1 | 4/2006 | Raizman et al. |
| 2006/0085484 A1 | 4/2006 | Raizman et al. |
| 2006/0101224 A1 | 5/2006 | Shah et al. |
| 2006/0107141 A1 | 5/2006 | Hekmatpour |
| 2006/0129542 A1 | 6/2006 | Hinshaw et al. |
| 2006/0179042 A1 | 8/2006 | Bram |
| 2006/0179116 A1 | 8/2006 | Speeter |
| 2006/0195416 A1 | 8/2006 | Ewen et al. |
| 2006/0212428 A1 | 9/2006 | Nelson |
| 2006/0218123 A1 | 9/2006 | Chowdhuri et al. |
| 2007/0038618 A1 | 2/2007 | Kosciusko et al. |
| 2007/0061379 A1 | 3/2007 | Wong et al. |
| 2007/0078825 A1 | 4/2007 | Bornhoevd et al. |
| 2007/0083500 A1 | 4/2007 | Zibitsker |
| 2007/0083563 A1 | 4/2007 | Souder |
| 2007/0136383 A1 | 6/2007 | Steinbach et al. |
| 2007/0214104 A1 | 9/2007 | Miao et al. |
| 2008/0010240 A1 | 1/2008 | Zait |
| 2008/0016123 A1 | 1/2008 | Devraj et al. |
| 2008/0040196 A1 | 2/2008 | Coon et al. |
| 2008/0052271 A1 | 2/2008 | Lam |
| 2008/0077348 A1 | 3/2008 | Hildebrand et al. |
| 2008/0098003 A1 | 4/2008 | Dias et al. |
| 2008/0114718 A1 | 5/2008 | Anderson et al. |
| 2008/0126393 A1 | 5/2008 | Bossman et al. |
| 2008/0162491 A1 | 7/2008 | Becker |
| 2008/0168058 A1 | 7/2008 | Gordon |
| 2008/0178079 A1 | 7/2008 | Chen et al. |
| 2008/0208820 A1 | 8/2008 | Usey |
| 2008/0215536 A1 | 9/2008 | Day et al. |
| 2008/0228710 A1 | 9/2008 | Muras |
| 2008/0235183 A1 | 9/2008 | Draese et al. |
| 2009/0006445 A1 | 1/2009 | Shemenzon et al. |
| 2009/0018992 A1 | 1/2009 | Zuzarte et al. |
| 2009/0037923 A1 | 2/2009 | Smith et al. |
| 2009/0077017 A1 | 3/2009 | Belknap et al. |
| 2009/0327214 A1 | 12/2009 | Richardson et al. |
| 2009/0327254 A1 | 12/2009 | Bruno et al. |
| 2010/0005340 A1 | 1/2010 | Belknap et al. |
| 2011/0126197 A1 | 5/2011 | Larsen et al. |
| 2012/0173717 A1 | 7/2012 | Kohli |
| 2013/0132349 A1 | 5/2013 | Hahn |
| 2013/0198211 A1* | 8/2013 | Kohkaki ............... H03M 7/00 707/756 |
| 2013/0290506 A1 | 10/2013 | Astete |
| 2014/0095530 A1* | 6/2014 | Lee ..................... G06F 16/256 707/683 |
| 2014/0188804 A1 | 7/2014 | Gokhale |
| 2014/0258241 A1 | 9/2014 | Chen |
| 2015/0254240 A1* | 9/2015 | Li ........................ G06F 16/27 707/703 |
| 2016/0014038 A1 | 1/2016 | Thyagarajan |
| 2016/0036623 A1* | 2/2016 | Clarkson ............ G06F 11/3495 714/4.11 |
| 2016/0092288 A1 | 3/2016 | Rawat et al. |
| 2016/0094406 A1* | 3/2016 | Phan ................... H04L 41/0843 709/223 |
| 2016/0188621 A1 | 6/2016 | Karinta et al. |
| 2017/0046205 A1 | 2/2017 | Kofkin-Hansen |
| 2017/0116207 A1 | 4/2017 | Lee |
| 2017/0315877 A1 | 11/2017 | Kaplingat |
| 2017/0316085 A1* | 11/2017 | Gupta ................. G06F 16/243 |
| 2017/0357550 A1 | 12/2017 | Jain |
| 2018/0060181 A1 | 3/2018 | Rajamani |
| 2018/0075044 A1 | 3/2018 | Kruglikov |
| 2018/0075086 A1 | 3/2018 | Yam |
| 2018/0096252 A1 | 4/2018 | Fagundes |
| 2018/0107711 A1 | 4/2018 | Tariq |
| 2018/0137139 A1* | 5/2018 | Bangalore ............ G06F 16/172 |
| 2019/0102411 A1 | 4/2019 | Hung et al. |

OTHER PUBLICATIONS

Yam, U.S. Appl. No. 15/266,917, filed Sep. 15, 2016, Advisory Action, dated Apr. 29, 2019.

Yam, U.S. Appl. No. 15/266,030, filed Sep. 15, 2016, Interview Summary, dated May 22, 2019.

Ravipati, U.S. Appl. No. 15/215,435, filed Jul. 20, 2019, Advisory Action, dated Jun. 5, 2019.

Lee, U.S. Appl. No. 15/215,446, filed Jul. 20, 2016, Interview Summary, dated May 3, 2019.

Lee, U.S. Appl. No. 15/215,446, filed Jul. 20, 2016, Advisory Action, dated Jun. 4, 2019.

Ravipati, U.S. Appl. No. 15/215,435, filed Jul. 20, 216, Office Action, dated May 6, 2020.

Lee, U.S. Appl. No. 15/215,446, filed Jul. 20, 2016, Notice of Allowance, dated Aug. 21, 2020.

Urbano Randy et al., "Oracle Database Administrator's Guide", 12c Release dated Jul. 31, 2017, pp. 1-1500.

Chaudhuri, Surajit, An Overview of Query Optimization in Relational Systems, Microsoft Research, 1998, 10 pages.

Erickson, Gail et al., "Improving Performance with SQL Server 2000 Indexed Views," Microsoft TechNet, Sep. 2000, Nov. 11, 2006, 10 pages.

Englert, Susan et al., A Benchmark of NonStop SQL Release 2 Demonstrating Near-Linear Speedup and Scaleup on Large Databases,Tandem Part No. 27469, May 1989, 32 pages.

Dewitt, et al., "A Performance Analysis of the Gamma Database Machine," Computer Sciences Department, University of Wisconsin, 1988, pp. 350-360.

Deutsch, Alin et al., Minimization and Group-By Detection for Nested Xqueries,University of California, San Diego, 2003, 15 pages.

Dehaan, David, "A Rewriting Algorithm for Multi-Block Aggregation Queries and Views using Prerequisites and Compensations", Technical Report CS-2004-25, May 3, 2004, 39 pages.

Dayal, Umeshwar,Of Nests and Trees: A Unified Approach to Processing Queries That Contain Nested Subqueries, Aggregates and Quantifiers, Brighton 1987, pp. 197-208.

(56) References Cited

OTHER PUBLICATIONS

Agrawal et al., "Automated Selection of Materialized Views and Indexex for SQL Databases", In Proceedings of the 26th International Conference on the Very Large Databases, dated 2000, 10 pages.
Copeland, George et al., "Data Placement in Bubba," ACM 0897912683, 1988, pp. 99-108.
Gopalkrishnand, Vivikanand, et al., "Issues of Object-Relational View Design in Data Warehousing Environment", IEEE 1998, 0780347781, pp. 2732-2737.
Chaudhuri, Surajit et al., Including Group-By in Query Optimization, Proceedings of the 20th VLDB Conference, 1994, pp. 354-366.
Borla-Salamet, Pascale, Compiling Control into Database Queries for Parallel Execution Management, IEEE Conference on Parallel Distributed Information Systems, 1991, pp. 271-279.
Bhide, Anupam, "An Analysis of Three Transaction Processing Architectures", Computer Science Division, UC Berkeley, Proceeding of the 14th VLDB Conference,1998, pp. 339-350.
Bergsten, et al., Prototyping DBS3 a Shared-Memory Parallel Database System, IEEE 818622954, 226-234, 1991, pp. 226-234.
Bello, Randall G. et al. Materialized Views in Oracle, VLDB '98, Proceedings of 24th International Conference, dated Aug. 24-27, 1998, New York City, New York, USA, pp. 659-664.
Arawal et al., "Database Tuning Advisor for Microsoft SQL Server 2005: Demo", In Proceedings of the 2005 ACM Sigmod International Conference on Management of Data, dated 2005, 3 pages.
Ahmed, Rafi, et al., "Cost-Based Query Transformation in Oracle", Copyright 2006 VLDB, ACM 1595933859, pp. 1026-1036.
Dageville et al., "Automatic SQL Tuning in Oracle 10g", In Proceedings of the Thirteenth International Conference on Very Large Databases, vol. 30, dated 2004, 12 pages.
Lumpkin, George et al., Query Optimization in Oracle 9i, Oracle Corporation, Oracle White Paper, Feb. 2002, pp. 1-30.
Stonebraker, Michael, et al. "The Design of XPRS," Proceedings of the 14th VLDB Conference, 1988, pp. 318-330.
Seshadri, Preveen, Cost-Based Optimization for Magic: Algebra and Implementation, SIGMOND '96, 1996 ACM 0-89791-794-4, pp. 435-446.
Selinger, P. Griffiths, et al., Access Path Selection in a Relational Database Management System, ACM SIGMOD International Conference on the Management of Data, 1979, pp. 23-34.
Pirahesh, Hamid, et al., Extensible/Rule Base Query Rewrite Optimization in Starburst, IBM Almaden Research Center, ACM, Sigmod, dated 1992, 10 pages.
Oracle® Database Performance Tuning Guide 10g Release 2 (10.2) Using Plan Stability, pp. 18-1 to 18-10, 10gR2 released Jul. 11, 2005.
Najjar, Faiza et al. "Cardinality estimation of distributed join queries", dated Sep. 1-3, 1999; Proceedings of theTenth International Workshop, pp. 66-70.
Muralikrishna, M., Improved Unnesting Algorithms for Join Aggregate SQL Queries, VLDB Conference, Canada, 1992, 12 pages.
Galindo-Legaria, Cesar et al., Outerjoin Simplification and Reordering for Query Optimization, ACM Transactions on Database Systems, vol. 22, No. 1, Mar. 1997, pp. 43-74.
Mishra, Priti et al., Join Processing in Relational Databases, ACM Computing Surveys, vol. 24, No. 1, Mar. 1992, pp. 63-113.
Gey et al., "Evolving Multi-tenant SaaS Applications through Self-Adaptive Upgrade Enactment and Tenant Mediation", SEAMS'16 May 16-17, 2016, Austin, TX, USA c 2016 AC,7 pages.
Leverenz et al., Oracle 8i Concepts Release 8.1.5-A67781-01, Oracle Corporation, Feb. 1999, <http://www.csee.umbc.edu/help/oracle8/server.815/a67781/toc.htm>, 122 pages.
Kung, Chenho, "Object Subclass Hierarchy in SQL: A Simple Approach", Communications of the AC, Jul. 1990, vol. 33, No. 7, pp. 117-125.
Hong, et al., Optimization of Parallel Query Execution Plans in XPRS, IEEE, 1991, 8 pages.
Hirano, et al., Load Balancing Algorithm for Parallel Processing on Shared Memory Multiprocessor, IEEE, pp. 210-217, 1991.

Hayu, John, Analytic SQL Features in Oracle9i, An Oracle Technical White Paper, Dec. 2001, 32 pages.
Graefe, Goetz, "Encapsulation of Parallelism in the Volcano Query Processing System," Mar. 1990, 14 pages.
Tandem, "A Benchmark of NonStop SQL on the Debit Credit Transaction", The Tandem Performance Group, 1988, 26 pages.
Moro, Gianluca et al. "Incremental maintenance of multi-source views", Database Conference, 2001, ADC 2001, Proceedings, 12th Australasian, Jan. 2001, pp. 13-20.
Kuremoto et al., "Time Series Forecasting Using Restricted Boltzmann Machine", Emerging Intelligent Computing Technology and Applications: 8th International Conference, dated Jul. 2012, 11 pages.
Lee, U.S. Appl. No. 15/215,446, filed Jul. 20, 2016, Office Action, dated May 8, 2020.
Yam, U.S. Appl. No. 15/266,917, filed Sep. 15, 2016, Office Action, dated Jun. 21, 2019.
Yam, U.S. Appl. No. 15/266,917, filed Sep. 15, 2016, Final Office Action, dated Feb. 4, 2019.
Yam, U.S. Appl. No. 15/266,030, filed Sep. 15, 2016, Office Action, dated Feb. 26, 2019.
Ravipati, U.S. Appl. No. 15/215,435, filed Jul. 20, 2016, Final Office Action, dated Mar. 14, 2019.
Lee, U.S. Appl. No. 15/215,446, filed Jul. 20, 2016, Final Office Action, dated Mar. 12, 2019.
Krugikov, U.S. Appl. No. 15/266,902, filed Sep. 15, 2016, Interview Summary, dated Feb. 20, 2019.
Krugikov, U.S. Appl. No. 15/266,902, filed Sep. 15, 2016, Final Office Action, dated Jan. 31, 2019.
Oracle, "White Paper for Oracle Multitenant", dated Jun. 2013, 53 pages.
Hung, U.S. Appl. No. 16/135,769, filed Sep. 19, 2018, Office Action, dated Mar. 12, 2020.
Rajamani, U.S. Appl. No. 15/254,884, filed Sep. 1, 2016, Notice of Allowance, dated Nov. 20, 2019.
Lee, U.S. Appl. No. 15/215,446, filed Jul. 20, 2019, Final Office Action, dated Dec. 4, 2019.
Krugikov, U.S. Appl. No. 15/266,902, filed Sep. 15, 2016, Notice of Allowance, dated Nov. 2, 2019.
Zisman et al., "An approach to interoperation between autonomous database systems", Distrib. Syst. Engng 6 (1999) 135-148. Printed in the UK, 15 pages.
Weishar et al., "An Intelligent Heterogeneous Autonomous Database Architecture for Semantic Heterogeneity Support", IEEE Workshop on Interoperability in Multidatabase Systems, dated Apr. 1991, 9 pgs.
Rodd et al., "Adaptive Tuning Algorithm for Performance tuning of Database Management System", (IJCSIS) International Journal of Computer Science Information Security,vol. 8, No. 1, Apr. 2010, 4pgs.
Pavlo, "Self-Driving Database Management Systems", 8th Biennial Conference on Innovative Data Systems Research (CIDR '17), Jan. 8-11, 2017 , Chaminade, California, USA, 6 pages.
Maenhaut et al., "Design and Evaluation of a Hierarchical Multi-Tenant Data Management Framework for Cloud Applications", dated 2015, 6 pages.
Gey et al., "Evolving Multi-tenant SaaS Applications through Self-Adaptive Upgrade Enactment and Tenant Mediation", SEAMS'16 May 16-17, 2016, Austin, TX, USA 2016 AC,7 pages.
Das et al., "Scalable and Elastic Transactional Data Stores for Cloud Computing Platforms", dated Dec. 2011, 302 pages.
Das et al., "Automated Demand-Driven Resource Scaling in Relational Database-as-aService", SIGMOD'16, Jun. 26-Jul. 1, 2016, San Francisco, CA, USA, 12 pages.
Beschastnikh et al., "Machine Learning for Automatic Physical DBMS Tuning", dated Dec. 6, 2007, 6 pages.
Agrawal et al., "Database Scalability, Elasticity, and Autonomy in the Cloud", dated 2011, 14 pages.
Yam, U.S. Appl. No. 15/266,917, filed Sep. 15, 2016, Notice of Allowance, dated Jan. 6, 2020.
Yam, U.S. Appl. No. 15/266,030, filed Sep. 15, 2016, Notice of Allownace, dated Dec. 20, 2019.
Yam, U.S. Appl. No. 15/266,030, filed Sep. 15, 2016, Notice of Allowability, dated Feb. 14, 2020.

(56) References Cited

OTHER PUBLICATIONS

Ravipati, U.S. Appl. No. 15/215,435, filed Jul. 20, 2016, Advisory Action, dated Jan. 24, 2020.
Ravipati, U.S. Appl. No. 15/215,435, filed Jul. 20, 2016, Interview Summary, dated Jan. 15, 2020.
Sata's DBA Blog: "Oracle Statistics", dated Jan. 3, 2013, http://satya-dba.blogspot.com/2010/06/oracle-database-statistics-rbo-cbo.html, 14 pages.
Yam, U.S. Appl. No. 15/266,030, filed Sep. 15, 2016, Final Office Action, dated Sep. 3, 2019.
U.S. Appl. No. 12/188,975, filed Aug. 8, 2008, Notice of Allowance, dated Jul. 24, 2014.
Rajamani, U.S. Appl. No. 15/254,884, filed Sep. 1, 2016, Office Action, dated Jun. 27, 2018.
U.S. Appl. No. 12/188,673, filed Aug. 8, 2008, Final Office Action, dated Dec. 22, 2011.
U.S. Appl. No. 12/188,673, filed Aug. 8, 2008, Advisory Action, dated Mar. 23, 2011.
U.S. Appl. No. 12/188,975, filed Aug. 8, 2008, Office Action, dated May 17, 2013.
U.S. Appl. No. 12/188,975, filed Aug. 8, 2008, Final Office Action, dated May 14, 2012.
U.S. Appl. No. 12/188,975, filed Aug. 8, 2008, Final Office action, dated Dec. 24, 2013.
U.S. Appl. No. 12/188,975, filed Aug. 8, 2008, Interview Summary, dated Dec. 17, 2013.
U.S. Appl. No. 12/188,975, filed Aug. 8, 2008, Office Action, dated Dec. 21, 2011.
U.S. Appl. No. 12/188,975, filed Aug. 8, 2008, Advisory Action, dated Feb. 6, 2014.
U.S. Appl. No. 12/188,975, filed Aug. 8, 2008, FInal Office Action, dated Oct. 17, 2013.
U.S. Appl. No. 12/188,981, filed Aug. 8, 2008, Final Office Action, dated Jun. 7, 2011.
U.S. Appl. No. 12/188,981, filed Aug. 8, 2008, Notice of Allowance, dated Aug. 17, 2012.
U.S. Appl. No. 12/188,981, filed Aug. 8, 2008, Office Action, dated Feb. 21, 2012.
U.S. Appl. No. 12/1888,975, filed Aug. 8, 2008, Final Office Action, dated May 9, 2011.
U.S. Appl. No. 188,981, filed Aug. 8, 2008, Office Action, dated Nov. 23, 2010.
U.S. Appl. No. 12/188,975, filed Aug. 8, 2008, Office Action, dated Nov. 29, 2010.
Ravipati, U.S. Appl. No. 15/215,435, filed Jul. 20, 2016, Office Action, dated Sep. 19, 2018.
Rajamani, U.S. Appl. No. 15/254,884, filed Sep. 1, 2016, Interview Summary, dated Sep. 24, 2018.
Lee, U.S. Appl. No. 15/215,446, filed Jul. 20, 2016, Restrcition Requirement, dated Oct. 1, 2018.
Kruglikov, U.S. Appl. No. 15/266,902, filed Sep. 15, 2016, Office Action, dated Aug. 6, 2018.
Ravipati, U.S. Appl. No. 15/215,435, filed Jul. 20, 2016, Interview Summary, dated Jan. 4, 2019.
Rajamani, U.S. Appl. No. 15/254,884, filed Sep. 1, 2016, Final Office Action, dated Nov. 21, 2018.
Sartain, JD, "Max Productivity", dated Feb. 17, 2015, 8 pages.
Sartain, JD, "5 Must-know Excel Macros for Common Tasks", dated Sep. 10, 2014, 12 pages.
Lee, U.S. Appl. No. 15/215,446, filed Jul. 20, 2020, Interview Summary, dated Aug. 11, 2020.
Hung, U.S. Appl. No. 16/135,769, filed Sep. 19, 2018, Final Office Action, dated Jul. 7, 2020.
Hung, U.S. Appl. No. 16/135,769, filed Sep. 19, 2018, Office Action, dated Feb. 22, 2021.
Yu et al., "Intelligent Database Placement in Cloud Environment", 2012 IEEE 19th International Conference on Web Services, Year 2012, 8 pages.
Gulati et al., "VMware Distributed Resource Management: Design, Implementation, and Lessons Learned", https://www.waldspurger.org/carl/papers/drs-vmtj-marl2.pdf, Year 2012, 20 pages.
Yu et al., "Intelligent Database Placement in Cloud Environment," 2012 IEEE 19th International Conference on Web Services, 2012, pp. 544-551.

* cited by examiner

AUTONOMOUS MULTITENANT DATABASE CLOUD SERVICE FRAMEWORK

RELATED APPLICATIONS

This application claims the benefit of Provisional Application No. 62/566,358, filed Sep. 30, 2017, titled "Autonomous Multitenant Database Cloud Service Framework", the entire contents of which is hereby incorporated by reference as if fully set forth herein, under 35 U.S.C. § 119(e). The applicant(s) hereby rescind any disclaimer of claim scope in the parent application or the prosecution history thereof and advise the USPTO that the claims in this application may be broader than any claim in the parent application. The following related patent and applications are incorporated herein by reference:
- U.S. Pat. No. 9,396,220 filed Mar. 10, 2014 titled "Instantaneous Unplug Of Pluggable Database From One Container Database And Plug Into Another Container Database";
- U.S. Pat. No. 8,903,801 filed Aug. 8, 2008 titled "Fully Automated SQL Tuning";
- U.S. Pat. No. 8,341,178 filed Aug. 8, 2008 titled "SQL Performance Analyzer";
- U.S. application Ser. No. 15/215,435 filed Jul. 20, 2016 titled "Cloning A Pluggable Database In Read-Write Mode";
- U.S. application Ser. No. 15/266,902 filed Sep. 15, 2016 titled "Provisioning of Pluggable Databases Using a Central Repository";
- U.S. application Ser. No. 15/266,030 filed Sep. 15, 2016 titled "Automatic Reconfiguration Of Relocated Pluggable Databases";
- U.S. application Ser. No. 15/254,884 filed Sep. 1, 2016 titled "Transportable Backups for Pluggable Database Relocation".
- U.S. Pat. No. 9,692,819 filed Apr. 13, 2015 titled "Detect Process Health Remotely in a Realtime Fashion";
- U.S. application Ser. No. 15/215,443 filed Jul. 20, 2016 titled "Techniques for Keeping a Copy of a Pluggable Database Up to Date with Its Source Pluggable Database in Read-Write Mode";
- U.S. application Ser. No. 15/215,446 filed Jul. 20, 2016 titled "Near-Zero Downtime Relocation of a Pluggable Database Across Container Databases";
- U.S. application Ser. No. 15/266,917 filed Sep. 15, 2016 titled "Asynchronous Shared Application Upgrade".

FIELD OF THE DISCLOSURE

This disclosure relates to administration of a multitenant data grid. Presented herein are workload management techniques that asynchronously configure pluggable databases within a compute cloud.

BACKGROUND

Production operations staff typically includes database administrators (DBAs) and other system administrators to perform database lifecycle management and administrative tasks. Hosting relationships between pluggable databases, container databases, and computers are more or less rigidly arranged into a network topology, such that software upgrades, horizontal scaling, and planned or emergency provisioning/configuration may be tedious and error prone, especially at cloud scale order(s) of magnitude larger than a simple computer cluster.

Rigid topology may hinder or prevent horizontal scaling (elasticity) and capacity planning. Database and data center administration typically occurs ad hoc and is typically based on imperative commands that are expected to execute more or less immediately. Thus, administrative chores tend to be synchronous in nature, such that opportunities for parallelism are limited. Thus, administrative job submission and job execution tend to be tightly coupled, thereby needing significant manual shepherding to achieve sequencing of related administrative activities. Thus, conventional opportunities for cloud-scale administrative automation may be limited. Thus, the evolution and migration of installed pluggable databases may also be limited, such as when tolerating a mediocre topology is easier than optimally rearranging pluggable databases. For example, relocation of a pluggable database from one container database and/or computer to another may require repackaging and redeployment of many clients and/or services, which may weigh against such relocation.

DETAILED DESCRIPTION

Figure 1:
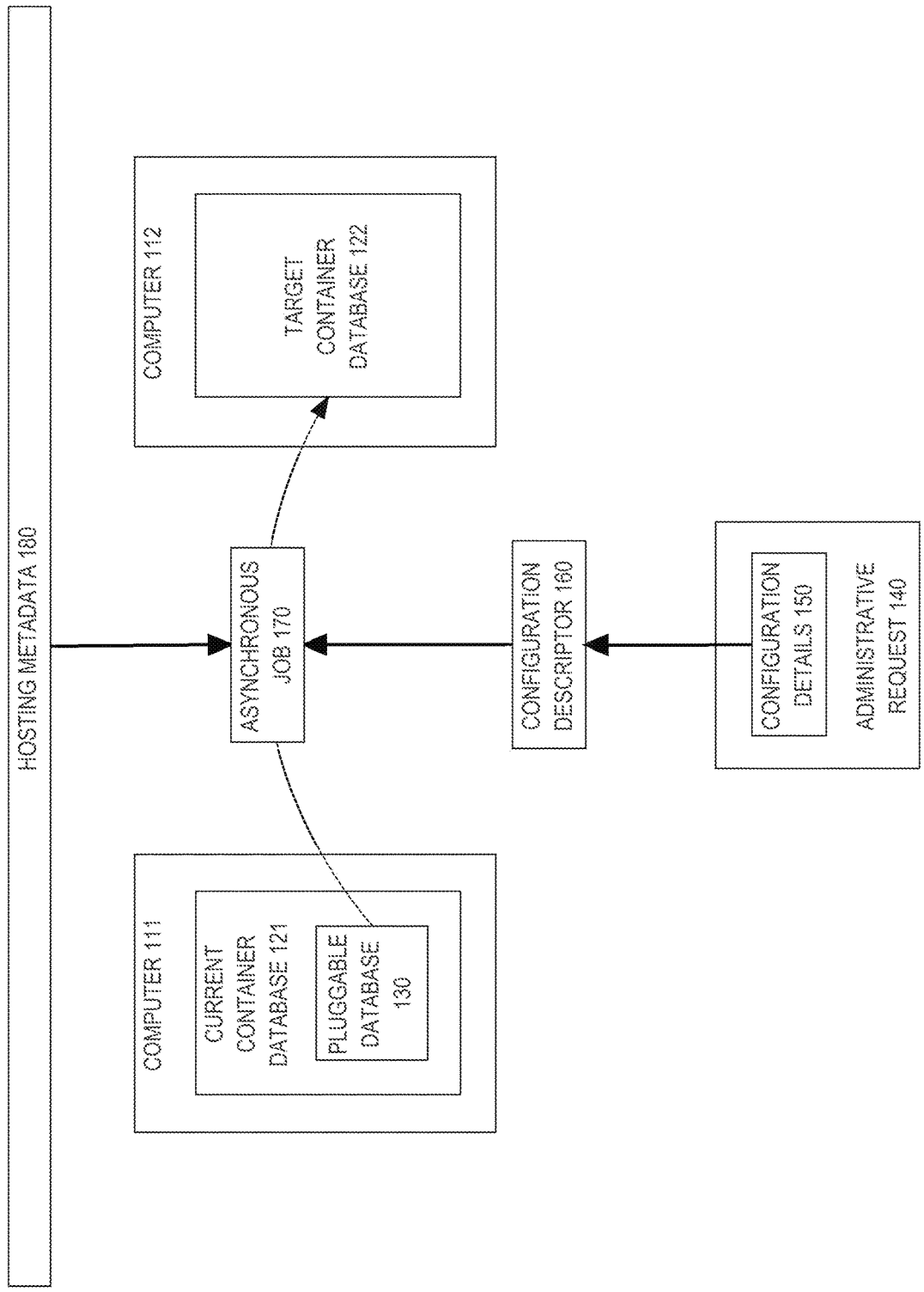
FIG. 1 is a block diagram that depicts an example cloud that uses an asynchronous job to eventually execute an administrative configuration request for a pluggable database, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Data Grid
   2.1 Container Database and Pluggable Database
   2.2 Administrative Request
   2.3 Configuration Details
   2.4 Configuration Descriptor
   2.5 Asynchrony
   2.6 Hosting Metadata
   2.7 Post Processing
3.0 Asynchronous Configuration Process
4.0 Distributed Computing
5.0 Horizontal Scaling
   5.1 Template
   5.2 Deployment Patterns
6.0 Autonomous Reconfiguration
   6.1 Monitor
   6.2 Upgrade/Downgrade
7.0 Workload Management
   7.1 Front Controller
   7.2 Swim Lanes
   7.3 Thread Pools
   7.4 Fanout
   7.5 Throughput
8.0 Director
   8.1 Wallet
   8.2 Data Partitions
9.0 Database System Overview
10.0 Pluggable Database and Container Database System Overview
11.0 Hardware Overview
12.0 Software Overview
13.0 Cloud Computing 1.0 General Overview Provided herein are workload management techniques that asynchronously configure or reconfigure pluggable databases within a compute cloud. In an embodiment, the compute cloud receives an administrative request that indicates configuration details for a pluggable database. The compute cloud generates a configuration descriptor that specifies an asynchronous job based on the configuration details of the administrative request. An asynchronous job is a unit of work that may be deferred, such as with scheduling or queueing. The compute cloud accesses hosting metadata to detect at least one of: a) a current container database that already hosts the pluggable database, b) a target container database that will host the pluggable database, or c) a particular computer that hosts at least one of: the current container database, or the target container database. The compute cloud executes the asynchronous job to configure the pluggable database based on at least one of: the hosting metadata, or the configuration descriptor. These components facilitate automated administration and performance optimization of an ecosystem of database management system(s) (DBMSs), which may include multitenant databases and/or hierarchies or federations of databases. A DBMS is explained in more detail in the DATABASE SYSTEM OVERVIEW section below. In some cases, there may be structural aggregation (e.g. nesting) of databases, such as when pluggable databases (PDBs) reside within container databases (CDBs). Nesting of a PDB within a CDB is explained in more detail in the PLUGGABLE DATABASE AND CONTAINER DATABASE SYSTEM OVERVIEW section below.

The elastic nature of an online cloud, such as a data cloud, entails a dynamic topology and, at least in the case of a public cloud, multitenancy. With techniques herein, a data cloud may be configured as a dynamic ecosystem of resources, including datastores and analytics, that may experience disturbances such as demand spikes, network weather, maintenance, and capacity growth, which have varying degrees of unpredictability. Herein is an asynchrony framework, based on various mechanisms and techniques, for configuring intelligent reactions that optimize cloud performance during changing environmental conditions.

The DBMSs herein may provide or cooperate with mechanisms of database transportability, such that a database may be automatically replicated or relocated. Thus, a cloud's logical topology and load distribution may be dynamic and optimizable. For example, a point of delivery (PoD) may be a unit of logical co-location of services. In an embodiment, computer may host one or more PoDs, each of which may host one or more container databases, each of which may host one or more pluggable databases. Creation, replication, movement, and removal of databases instance(s) may occur according to a well defined (e.g. uniform) lifecycle of a database.

Asynchronous administration jobs may be submitted for execution of some or all pluggable database (PDB) lifecycle tasks across a set of points of delivery (PoDs), container databases, or other database hosting middleware. In an embodiment, the asynchronous job framework provides representational state transfer (REST) APIs for clients to submit requests which are then translated into asynchronous jobs. An asynchronous job is a unit of work that may be deferred, such as with scheduling or queueing. Asynchronous jobs may be submitted in one ordering and then executed in another temporal ordering. All aspects of job management, including persistence, scheduling, assignment, execution, recovery and error handling are handled within the system. Jobs are routed to the correct PoD where it is executed using the PoD APIs. Major components described herein are independently and horizontally scalable.

Solutions presented herein have asynchronous jobs that configure or reconfigure pluggable databases, such as an asynchronous database administration job. For example, an asynchronous database administration job may create or drop an index of a relational table, or create, replicate, move, or remove a database instance. Generally, a database configuration or reconfiguration is a system change that defines, removes, or adjusts (e.g. redefines) a database object such as a database instance, a schema, a namespace, a table, a relation, an index, a file, or logic. Configuration may be part of provisioning and deployment of a database or database object at a given computer and/or within a given database or DBMS, such as during relocation from another computer or DBMS. Reconfiguration may be an adjustment or removal of a database or database object. Configuration or reconfiguration may entail execution of data definition language (DDL), adjustment of content of a data dictionary of a DBMS, and/or addition, alteration, or removal of resources such as files.

Administrative requests may arise to configure or reconfigure pluggable databases. For example, a pluggable database may exhaust disk space. Responsively, an administrative request may be submitted to move a pluggable database from on container database or computer to another container database or computer. An administrative request may be sent to a request broker as a REST request that indicates configuration details that identify a pluggable database and specify evicting (relocating) the pluggable database. The request broker dispatches an asynchronous job based on the REST request. Based on the configuration details, the asynchronous job moves the pluggable database to another container database on another computer.

The solutions may have components that cause asynchrony such as queues, thread pools, swim lanes, and executors. In an embodiment, thread pools, swim lanes, and/or job queues facilitate load balancing to avoid priority inversion, starvation, and denial of service. In an embodiment, a load balancer and/or a hosting catalog confer location independence to pluggable databases. In an embodiment, cloning pluggable database instances from a pluggable database template facilitates elastic horizontal scaling.

2.0 Example Data Grid

FIG. 1 is a block diagram that depicts an example cloud 100, in an embodiment. Cloud 100 uses an asynchronous job to eventually execute an administrative request for a pluggable database. To operate as a data grid, cloud 100 is composed of cluster(s) of computers such as 111-112 that host databases such as 121-122 and 130. For example, each of databases 121-122 and 130 may be a relational database that is managed by a same database management system (DBMS). Each of computers 111-112 may be a personal computer, rack server such as a blade, mainframe, virtual machine, or any networked computing device capable of hosting a database. Computers 111-112 may communicate with each other and other computers (not shown) via a network, such as a local area network (LAN), or network of networks such as the global Internet. Computers 111-112 may be collocated, such as on a same rack, or separated such as in different data centers.

2.1 Container Database and Pluggable Database

Cloud 100 hosts databases such as pluggable database 130 in a way that may hide topology details from clients (not shown). For example, a client may use pluggable database 130 without knowledge of which data center, computer, and container database actually host pluggable database 130. A container database, such as 121-122, may contain pluggable databases such as 130. For example, container database 121 may be shared by multiple tenants that may or may not share various pluggable databases that are hosted by the container database 121.

2.2 Administrative Request

In operation, a database administrator (DBA) person or administrative software may submit administrative request 140 to create, configure, or reconfigure pluggable database 130 without knowledge of where pluggable database 130 is or will be hosted. For example, cloud 100 repeatedly may implicitly or spontaneously relocate pluggable database 130 to a different container database and/or computer at more or less arbitrary times. Thus, configuration details 150 within administrative request 140 need not identify a container database or a computer.

For example from a more or less arbitrary computer that does or does not reside within cloud 100, a DBA may submit administrative request 140 to cloud 100 for execution. Administrative request 140 may be delivered to cloud 100 as a hypertext transfer protocol (HTTP) request, such as a common gateway interface (CGI) post, a representational state transfer (REST) request, a remote procedure call (RPC), a simple object access protocol (SOAP) call, an asynchronous JavaScript XML (extensible markup language) (AJAX) request, or other remote data delivery mechanism.

2.3 Configuration Details

Administrative request 140 is goal/result oriented and need not specify a tactic or strategy to execute. For example, configuration details may specify that pluggable database 130 should be created or adjusted to suit certain high level requirements.

For example if pluggable database 130 is running out of disk space, then configuration details 150 may specify a larger amount of disk space. Cloud 100 has flexibility in fulfilling administrative request 140. For example, more disk space may be achieved by moving tablespace files of pluggable database 130 from one filesystem to another as (cross-)mounted on a same computer as before. Instead, more disk space may be achieved by adjusting the virtual machine allocation in which pluggable database 130 is hosted (and perhaps restarting the virtual machine). Instead, cloud 100 may actually have to move pluggable database 130 from one container database and/or computer to another.

Likewise if pluggable database 130 is performing poorly, then configuration details 150 may specify more processing power such as more processors, processor cores, threads, or parallelism. Cloud 100 may fulfill administrative request 140 by granting more processor cores to a virtual machine that hosts pluggable database 130. Instead, cloud 100 may actually have to move pluggable database 130 from one container database and/or computer to another to acquire more processing power.

Cloud 100 does not immediately (synchronously) execute administrative request 140. For example, fulfilling administrative request 140 may entail taking pluggable database 130 temporarily out of service. Thus, configuration details 150 may specify a time, a time window, an amount of idleness or light workload, or other dynamic condition to occur before administrative request 140 should be executed. Alternatively, cloud 100, pluggable database 130, or any involved container database or computer may be temporarily too busy (e.g. demand spike) to immediately execute administrative request 140. Thus, cloud 100 may queue, buffer, or otherwise defer execution of administrative request 140.

2.4 Configuration Descriptor

Cloud 100 uses configuration descriptor 160 and asynchronous job 170 for deferred execution of administrative request 140. Upon receipt of administrative request 140, cloud 100 generates configuration descriptor 160 based on administrative request 140 and configuration details 150. Configuration descriptor 160 encodes a normalized specification of administrative request 140 in a format suitable for storage and eventual dispatch to asynchronous job 170 for execution. Configuration descriptor 160 may be an encoded document such as XML, or JavaScript object notation (JSON). Normalization may entail conversion and/or scaling of numeric units (as discussed later herein) or range limiting. For example, configuration details 150 may specify overnight execution, which cloud 100 may translate into configuration descriptor 160 as a time window of particular late-night hours. For example, a request for less than a minimum amount of a resource may be rounded up. Also as discussed later herein, specified amounts of resources may be interdependent in enforceable ways, such as allocated volatile memory should not exceed allocated durable storage.

Cloud 100 may buffer or store configuration descriptor 160 in memory, in a database, or in a file. Cloud 100 may (e.g. synchronously) acknowledge to whichever client submitted administrative request 140 that the request is accepted and pending. For example if administrative request 140 arrived as an HTTP request, then cloud 100 may synchronously send an HTTP response that acknowledges that administrative request 140 has at least been queued. The acknowledgement may include a tracking identifier that the client may subsequently use to cancel, pause, or poll for status of administrative request 140. The acknowledgement may include an object oriented receiver (such as a computational future, a remote future, or a smart stub) that can poll and/or wait for administrative request 140 to actually be fulfilled. A receiver may be an instance of an object-oriented class. A receiver may be active, such as a smart stub that polls for status. A stub is a remote proxy. A smart stub is a stub that includes extra logic for flexibility for locating service(s) and/or managing repetition such as polling or retries. A receiver may be passive, such as suspended while waiting for a status or completion message or signal from cloud 100.

2.5 Asynchrony

Upon generation of configuration descriptor 160, cloud 100 may immediately or eventually create (or reuse) asynchronous job 170 to execute administrative request 140 based on configuration descriptor 160. For example, asynchronous job 170 may be reused from a pool of lightweight threads, heavyweight operating system processes, or other executors. Upon assigning configuration descriptor 160 to asynchronous job 170, asynchronous job 170 may immediately or eventually execute (fulfill) administrative request 140 according to configuration descriptor 160. For example, asynchronous job 170 may idle until configuration descriptor 160 is assigned to it. For example, configuration descriptor 160 may specify that execution of administrative request 140 should not begin until midnight.

Alternatively, asynchronous job 170 may execute other requests one at a time from a queue of pending configuration descriptors. When configuration descriptor 160 eventually reaches the head of the queue, asynchronous job 170 may de-queue and execute configuration descriptor 160. For example, configuration descriptor 160 may be a JSON document in a Java message service (JMS) queue. In embodiments, the queue may be a priority queue based on any of: a) a priority indicated in configuration descriptors such as 160, b) a deadline (completion time) or time to live (TTL) indicated in configuration descriptors, or c) a request type such as create database, move database, increase database quality of service, replicate database, etc. For example, backup and replica creation are naturally low priority. Whereas, increasing quality of service is naturally high priority because a database is becoming inadequate, such as rising latency or exhausting disk space. Database restoration from backup may be urgent.

2.6 Hosting Metadata

Asynchronous job 170 may load, parse, or otherwise process configuration descriptor 160 to discover what configuration change(s) to execute for a pluggable database. If configuration descriptor 160 does not identify a container database or computer, cloud 100 may retrieve needed identifiers from hosting metadata 180. Hosting metadata 180 provides directory information that maps an identifier of a pluggable database to identifiers of a container database and/or computer that hosts the pluggable database. Hosting metadata 180 may be implemented with a lookup table, a database table, or other referential data structure such as a map. Hosting metadata may be deployed as a file, a network service, or otherwise. Hosting metadata 180 may have additional information such as measurements of resource capacities and utilizations, resource requirements, and database interdependencies. For example, hosting metadata 180 may indicate facts such as: a) a particular container database has a particular pluggable databases, b) an amount of disk space is used by a particular pluggable database, c) a count of processing cores a particular computer has, d) a particular physical computer hosts particular virtual computers, e) a particular computer hosts particular container databases, f) particular container databases have replicas of a particular pluggable database, g) particular container databases host data partitions of a particular multi-instance pluggable database, and h) particular computers and databases have particular flavors, release levels, and patch levels.

For example, asynchronous job 170 may detect that configuration descriptor 160 specifies three processor cores for pluggable database 130. Asynchronous job 170 may consult hosting metadata 180 to discover that pluggable database 130 resides in current container database 121 that resides on computer 111. Hosting metadata 180 may indicate: a) current container database 121 is limited to two processing cores, even though b) computer 111 has four processing cores. Thus, asynchronous job 170 may decide that pluggable database 130 needs to be moved to a different container database. For example, hosting metadata 180 may indicate: a) computer 112 also has four processing cores and, b) target container database 122 has no limit on using processing cores. Thus, asynchronous job 170 may select target container database 122 for where to move pluggable database 130 to. Thus, asynchronous job 170 may fulfil administrative request 140 by moving pluggable database 130 to target container database 122.

2.7 Post Processing

After fulfilling administrative request 140, asynchronous job 170 may additionally post process in various ways. Asynchronous job 170 may notify cloud 100 or a client that administrative request 140 is finished. Asynchronous job 170 may update hosting metadata 180 to reflect changes made by asynchronous job 170. Asynchronous job 170 may idle, return to a worker pool, de-queue another administrative request, or await destruction such as being garbage collected or otherwise deallocated.

3.0 Asynchronous Configuration Process

Figure 2:
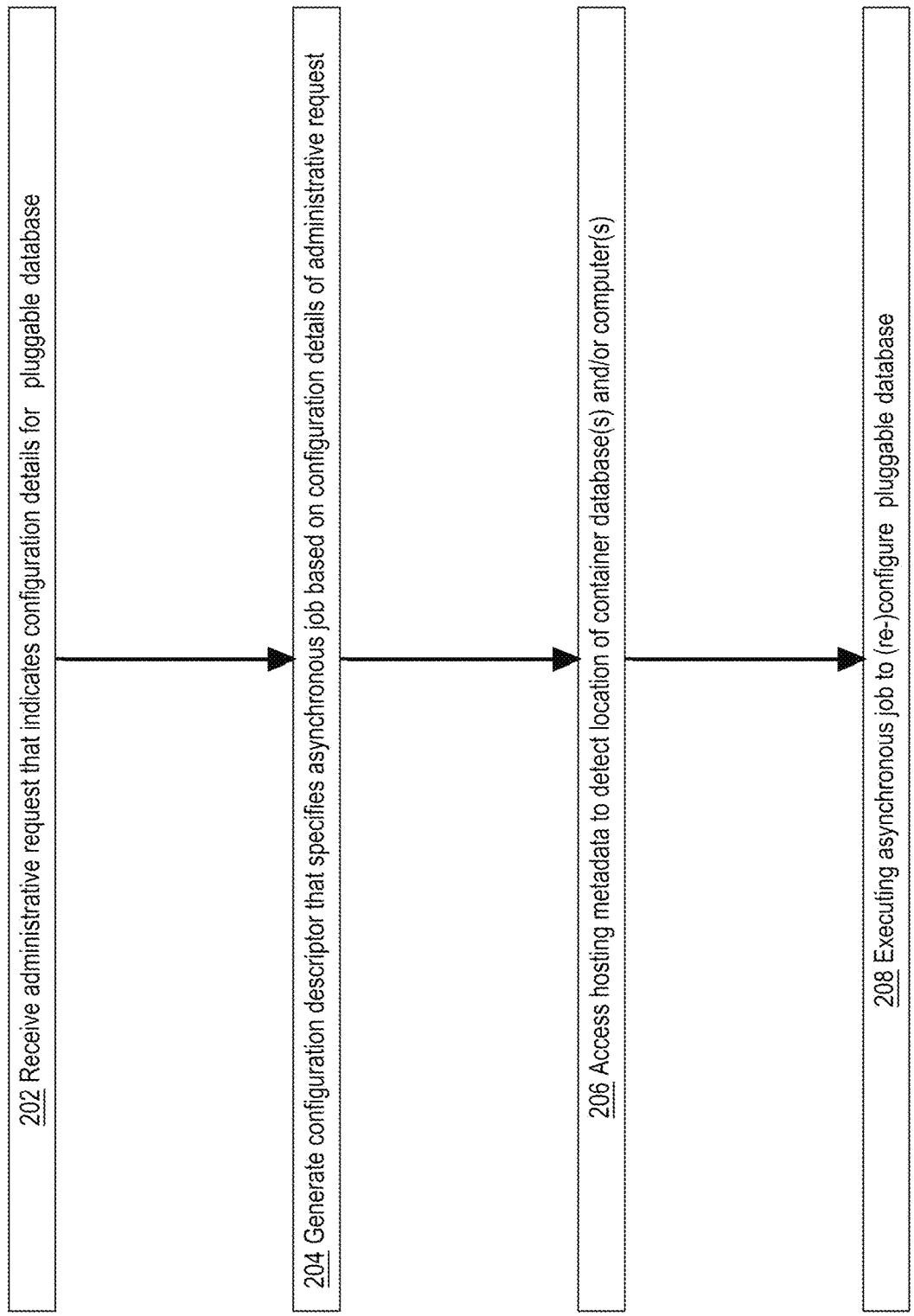
FIG. 2 is a flow diagram that depicts an example asynchronous configuration process to eventually execute an administrative request for a pluggable database, in an embodiment.

FIG. 2 is a flow diagram that depicts an example asynchronous configuration process to eventually execute an administrative request for a pluggable database using an asynchronous job, in an embodiment. FIG. 2 is discussed with reference to FIG. 1.

In step 202, an administrative request that indicates configuration details for a pluggable database is received. For example, cloud 100 receives (from an external client or from an internal facility) administrative request 140 from an administrator that wants to reconfigure pluggable database 130. For example, the administrator wants to decrease latency of pluggable database 130 by giving pluggable database 130 more memory (e.g. bigger database cache). The administrator may use a web browser to create configuration details 150 that specify a bigger amount of memory in administrative request 140.

In step 204, the cloud generates a configuration descriptor that specifies an asynchronous job based on the configuration details of the administrative request. For example, cloud 100 refers to configuration details 150 and administrative request 140 when generating configuration descriptor 160. For example, configuration descriptor 160 may be a work ticket that defines a pending unit of work. Cloud 100 may: a) prepare to immediately execute configuration descriptor 160, b) enqueue the descriptor for later execution, or c) schedule configuration descriptor 160 for execution at a relative or absolute time in the future.

In step 206, the cloud accesses hosting metadata to detect location(s) of container database(s) and/or computer(s) that already or will host the pluggable database. Although step 206 is shown as occurring between steps 204 and 208, some or all activities of step 206 may actually eagerly occur during step 204 or lazily occur during step 208. For example, selection of a target container database or computer to move pluggable database 130 may occur at step 204. Whereas, identification of a current container database of pluggable database 130 may occur at step 208 or vice versa. Step 204 may occur more or less when administrative request 140 is received. Whereas, step 208 may be deferred until a convenient time to actually fulfill administrative request 140. Either of those times may be appropriate to perform some or all of step 206. For example, accessing hosting metadata 180 may be performed by asynchronous job 170 or by cloud 100 before creating asynchronous job 170 just in time for administrative request 140 to actually be executed.

In step 208, the cloud executes the asynchronous job to configure or reconfigure the pluggable database. For example, cloud 100 may detect that pluggable database 130 and/or current container database 121 may have its memory allocation increased, and so cloud 100 does not need to move pluggable database 130 to another container database. Thus in step 208, asynchronous job 170 may simply adjust pluggable database 130 and/or current container database 121 to reserve more memory.

At any point in the lifecycle of asynchronous job 170, including any of the above steps, asynchronous job 170 may spawn additional administrative requests. For example while fulfilling administrative request 140, asynchronous job 170 may clone a pluggable database 130 by submitting a second administrative request to create a backup of pluggable database 130 from current container database 121, and a third administrative job to restore the backup of pluggable database 130 into target container database 122. Automatic backup techniques for pluggable databases are presented in related U.S. application Ser. No. 15/254,884.

4.0 Distributed Computing

Figure 3:
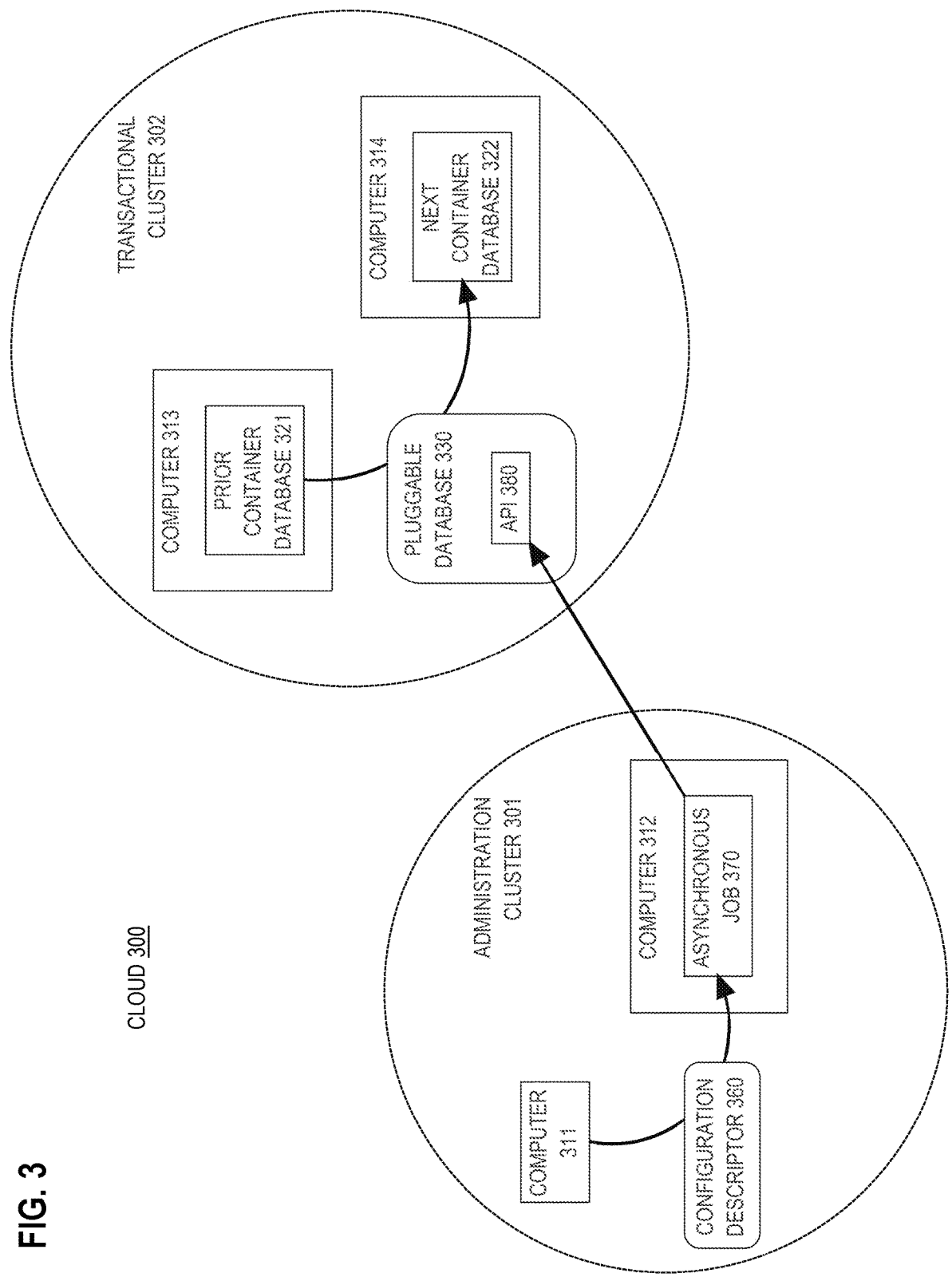
FIG. 3 is a block diagram that depicts an example cloud that disperses responsibilities across a topology of computers that spans multiple clusters, data centers, sub-clouds, and/or security realms, in an embodiment.

FIG. 3 is a block diagram that depicts an example cloud 300, in an embodiment. Cloud 300 disperses responsibilities across a topology of computers, such as 311-314, and may span multiple clusters, data centers, sub-clouds, and/or security realms. Cloud 300 has administration cluster 301 for managing requests to administer transactional cluster 302 that provides a live data grid. Cloud 300 may be an implementation of cloud 100.

Computer 311 may be an edge computer that faces human administrators who submit administrative requests to configure pluggable databases in the data grid. Computer 311 may receive an administrative request, convert the request into configuration descriptor 360, and make the descriptor available to asynchronous job 370 that resides on computer 312. Asynchronous job 370 eventually executes by moving pluggable database 330 between container databases 321-322. To perform the move, asynchronous job 370 may invoke at least one application programming interface (API) provided by at least one of pluggable database 330 or container databases 321-322. For example, asynchronous job 370 may use open database connectivity (ODBC) to remotely invoke API 380 that calls a stored procedure within pluggable database 330 that causes pluggable database 330 to replicate itself into next container database 322 and then delete itself from prior container database 321, thereby accomplishing the move.

As explained later herein, an administrative topology facilitates horizontal scaling, load balancing, and prioritization. Furthermore, clusters 301-302 may occupy different security realms. Alternatively and although not shown, the topology of cloud 300 may be more or less flattened and lacking subdivisions such as clusters 301-302. Asynchronous job 370 may perform distributed maintenance, such as administration of some or all of databases 321-322 and 330. Changes may need replication, such as for a horizontally scaled pluggable database. Techniques for automatically propagating changes between pluggable databases are presented in related U.S. application Ser. Nos. 15/215,443 and 15/266,030.

Databases 321-322 and 330 may be tuned, such as by techniques for tuning relational databases and SQL query execution. Asynchronous job 370 may gather performance information such as statistics of databases 321-322 and 330. Asynchronous job 370 may analyze the performance information and accordingly tune databases 321-322 and 330. Techniques for automatic performance tuning of a relational database are presented in related U.S. Pat. No. 8,903,801. Techniques for automatic performance analysis of a relational database are presented in related U.S. Pat. No. 8,341,178.

5.0 Horizontal Scaling

Figure 4:
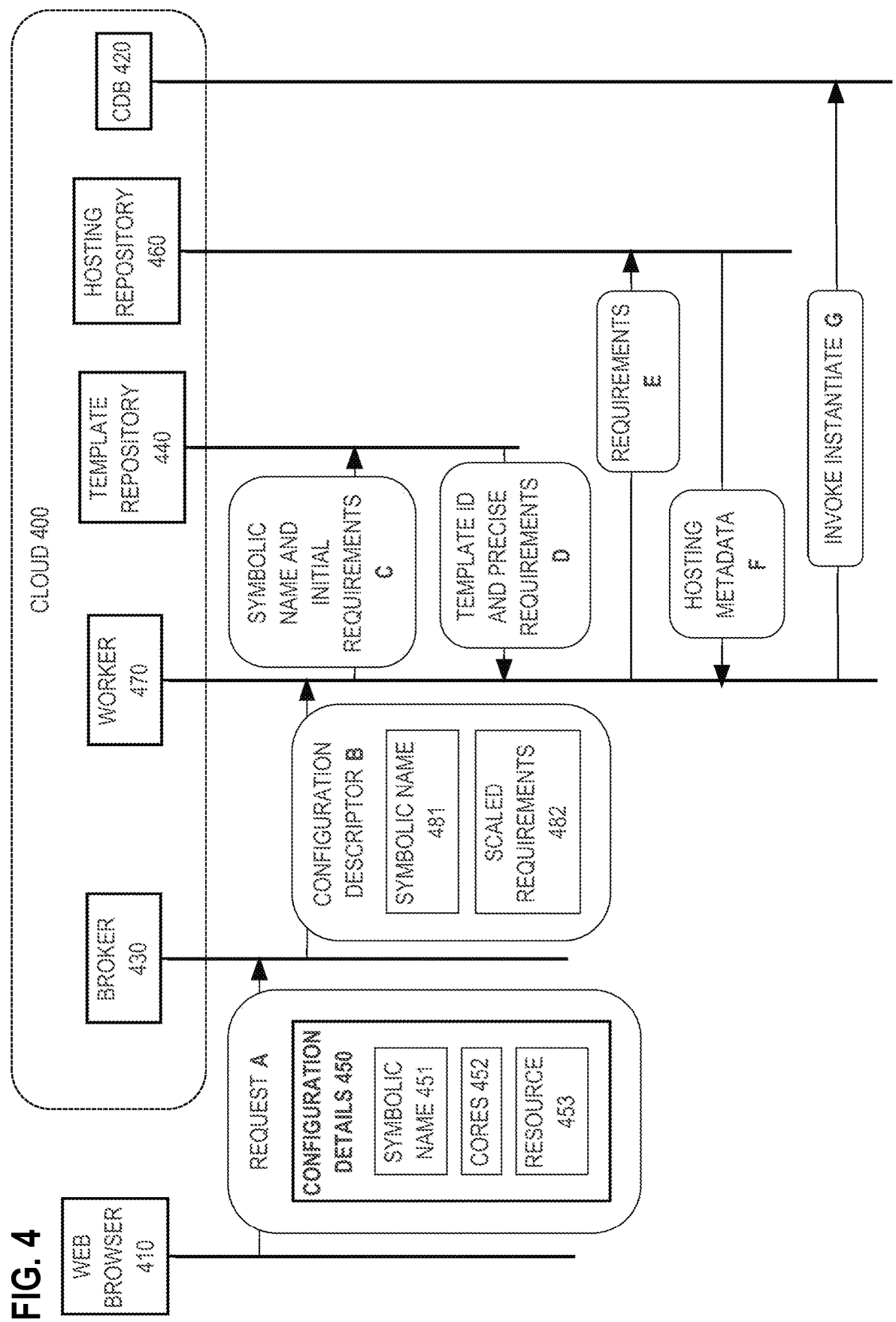
FIG. 4 is a block diagram that depicts an example cloud that uses a template pluggable database for prototype based cloning at a point of delivery (PoD), such as for horizontal scaling, in an embodiment.

FIG. 4 is a block diagram that depicts an example cloud 400, in an embodiment. Cloud 400 uses a template pluggable database for prototype based cloning at a point of delivery (PoD), such as for horizontal scaling. Cloud 400 hosts components 420, 430, 440, 460, and 470 that each may be a networked computer or a co-locatable software service that may share a computer. Cloud 400 may be an implementation of cloud 100.

From outside cloud 400, a human administrator may submit administrative request A from web browser 410 to broker 430. Request A specifies templatized deployment of a pluggable database (not shown) to an elastic cluster (not shown) of computers. For simplicity of this example although not necessarily typical, this pluggable database is a read-only database such as for reporting or online analytical processing (OLAP). Thus, each replica of the pluggable database may be used without need for data synchronization. Request A contains configuration details 450 that indicate that the pluggable database's cluster may grow to ten computers and shrink to three computers, with each computer having a private instance of the pluggable database. A private database instance in this example is: a) used only by its host computer, and b) not synchronized with other instances of the pluggable database on other computers in the cluster. In more complex examples, the pluggable database instances may: a) be synchronized replicas, b) cross-reference each other, c) be remotely accessible, and/or d) each have a distinct data partition. In this example, the private instances may be discarded without synchronization when the cluster shrinks. Other examples may have other lifecycles, such as bulk synchronization before decommissioning an instance being discarded. Not shown may be a monitor that automatically submits an administrative request to grow or shrink the cluster when demand rises or falls for the pluggable database.

Configuration details 450 may directly identify a pluggable database template or indirectly identify a template by symbolic name 451 that is globally unique and remappable amongst similar templates as follows. Broker 430 copies symbolic name 451 from request A into configuration descriptor B that is eventually dispatched as an asynchronous job for worker 470 to execute.

Broker 430 may specially process data from configuration details 450 when populating configuration descriptor B. For example, resource 453 may specify how much memory to reserve for each processing core of the host computer of the pluggable database targeted by the asynchronous job, and cores 452 may specify a count of cores. Broker 430 may calculate a total amount of memory as a multiplicative product of cores times core memory. Broker 430 may record the cores and total memory as scaled requirements 482. For example, configuration details 450 may specify two cores and three megabytes of memory per core. Thus, scaled requirements 482 may be scaled to specify 2×3=6 megabytes of total memory for the pluggable database. Broker 430 may perform other adjustments to other fields of configuration details 450 to populate scaled requirements 482. Later when the asynchronous job runs, worker 470 may make further adjustments to the same or different data of scaled requirements 482.

5.1 Template

Eventually, worker 470 executes configuration descriptor B. Worker 470 uses template repository 440 to select and inspect a template. Worker 470 sends symbolic name and initial requirements C (based on configuration descriptor B) to template repository 440. Template repository 440 uses an internal mapping (not shown) to select a template pluggable database based on symbolic name and initial requirements C. For example the symbolic name may be "sales history" and requirements C may specify Alaska, which template repository 440 uses to select a template named "small sales history".

Template repository 440 delivers the template or the template's handle back to worker 470 in template ID and precise requirements D. For example, precise requirements D may indicate that a pluggable database instance cloned from the selected template needs one gigabyte of disk space. Thus, worker 470 may need to adjust scaled requirements 482 accordingly. Techniques for using a template repository to automatically instantiate pluggable databases are presented in related U.S. patent Ser. No. 15/266,902

Worker 470 announces adjusted requirements E to hosting repository 460 for selection of a suitable container database on a suitable computer to host the pluggable database to be cloned from the template. Because requirements E (per request A) asks for a multi-instance cluster, hosting repository 460 selects multiple container databases (and computers) and announces them to worker 470 in hosting metadata F that identifies multiple container databases. Techniques for cloning a pluggable database are presented in related U.S. patent application Ser. No. 15/215,435.

In this example, one of the selected container databases is shown as CDB 420, which may be hosted by additional middleware such as a point of delivery (PoD). Each PoD may have its own computer or at least its own virtual computer. Thus, a PoD may be a unit of deployment, administration, and horizontal scaling. Typically one PoD hosts one container database (CDB). Thus, PoD and CDB may be used more or less as synonyms. Because CDB 420 is a multitenant container database, it may host unrelated pluggable databases, such as for other cloud customers. Worker 470 invokes an instantiation service, such as G, on each of several PoDs to populate the elastic cluster with clones of the pluggable database template. Worker 470 may distinguish individual PoDs by providing instantiation parameters and/or applying limited customization to each pluggable database instance created.

5.2 Deployment Patterns

Templatized deployments are especially amenable to administration patterns and scenarios that exploit replication, redundancy, or uniformity to increase reliability, availability, and serviceability (RAS). For example, request A may specify a same configuration change for all instances of pluggable database. Worker 470 may fulfil request A by applying the same configuration change to one pluggable database when only one or a few instances of the pluggable database are reconfigured at a time. Thus, most instances of the pluggable database remain in service at a given moment in time, and all instances are eventually reconfigured, one instance after the other. Thus, cloud 400's template automation may include applying a rolling upgrade of a multi-instance pluggable database, during which latency may temporarily increase while any one of the database instances is reconfigured, but always at least some instances of the pluggable database remain in service.

6.0 Autonomous Reconfiguration

Figure 5:
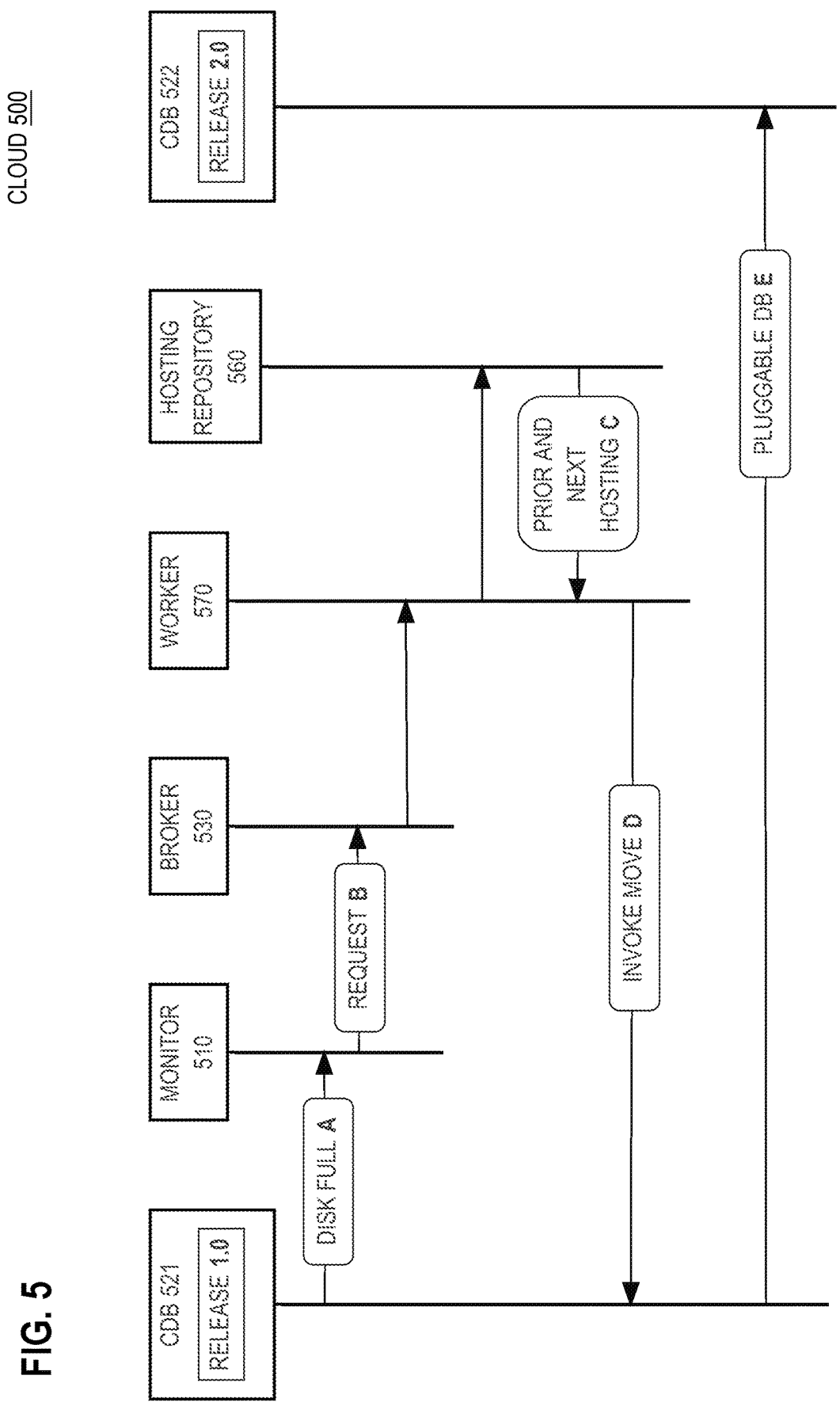
FIG. 5 is a block diagram that depicts an example cloud that has automatic reflexes to heal a topology, in an embodiment.

FIG. 5 is a block diagram that depicts an example cloud 500, in an embodiment. Cloud 500 has automatic reflexes to heal a topology. In this example, cloud 500 automatically relocates and upgrades a pluggable database E in reaction to a full disk. Cloud 500 may be an implementation of cloud 100.

6.1 Monitor

Cloud 500 contains components 510, 521-522, 530, 560, and 570, each of which may be a computer or a co-locatable software service that shares a computer. Monitor 510 receives telemetry from components of cloud 500, such as measurements and alerts. Monitor 510 may be configured with reflexes, such as rule-based reactions, that: a) in a configurable way, detect environmental conditions such as alerts, threshold crossings, and other conditions; b) make configurable decisions on how to react; and c) emit administrative requests to execute its decisions. Realtime telemetry techniques for automatically monitoring remote system health are presented in related U.S. Pat. No. 9,692,819.

Disk full A may be an alert that a disk is already full, or that the disk is nearly full according to a crossed threshold, such as when CDB 521 has a busy period that generates an immense audit log. In reaction to disk full A, monitor 510 may decide to: a) switch to using a storage area network (SAN) for some files such as audit files, b) move the container database (and its pluggable databases) to a PoD that has a bigger disk, or c) evict some pluggable database(s) from the container database. As shown, monitor 510 decides to evict pluggable database E from CDB 521 by generating request B.

6.2 Upgrade/Downgrade

Execution of request B entails interrogation of hosting repository 560 that answers by announcing prior and next hosting C that indicates that pluggable database E should be moved into CDB 522. Prior and next hosting C also indicates a software version mismatch, for which worker 570 should apply a software upgrade (or downgrade) to pluggable database E during the move. Each of CDBs 521-522 has a tall stack of system and application software layers, and each software layer has its own lifecycle of releases and patches. Thus, a version mismatch may involve one, some, or all of container database DBMS, PoD framework, bytecode interpreter, virtualization middleware, operating system, or other installed software infrastructure.

Worker 570 may use prior and next hosting C to detect a version mismatch and execute migration scripts to migrate pluggable database E to a target release. Migration scripts may include artifacts such as shell scripts, python scripts, native executables, stored procedures, and other structured query language (SQL) such as data definition language (DDL) or data manipulation language (DML). Migration scripts may adjust artifacts such as schemas, table content, and files. Some migration scripts may run to prepare pluggable database E for relocation. Other migration scripts may run to prepare target CDB 522 to host pluggable database E.

Still other migration scripts may make adjustments to pluggable database E after moving pluggable database E into CDB 522.

Techniques for automatic relocation of a pluggable database from one container database to another are presented in related U.S. Pat. No. 9,396,220 and U.S. patent application Ser. No. 15/215,446. Techniques for automatic upgrade of pluggable databases are presented in related U.S. application Ser. No. 15/266,917.

7.0 Workload Management

Figure 6:
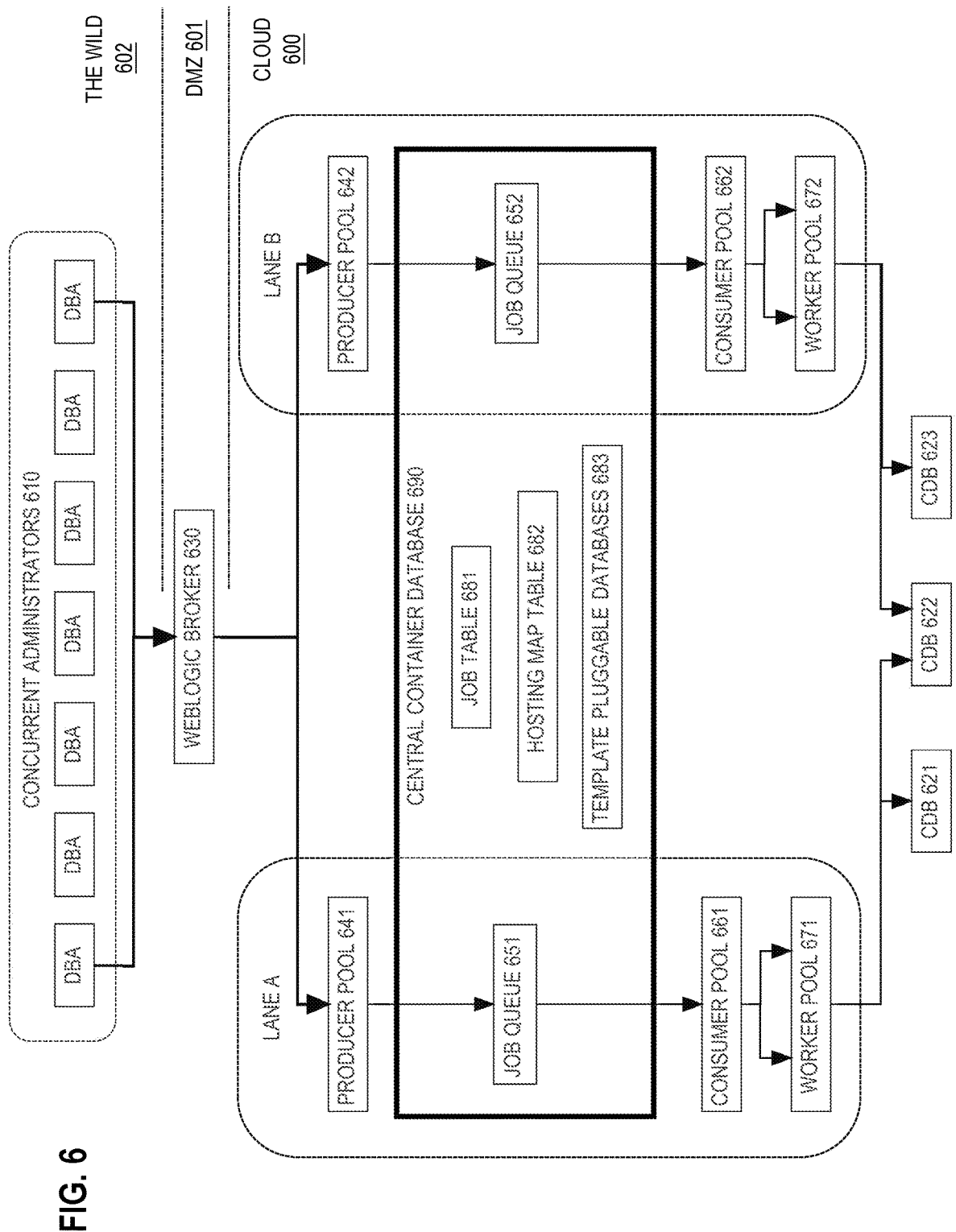
FIG. 6 is a block diagram that depicts an example cloud that has thread pools and swim lanes for workload management, in an embodiment.

FIG. 6 is a block diagram that depicts an example cloud 600, in an embodiment. Cloud 600 has thread pools and swim lanes for workload management. Cloud 600 may be an implementation of cloud 100. Cloud 600 contains CDBs 621-623 whose pluggable databases are configured by components 641-642, 651-652, 661-662, and 671-672 that are arranged in swim lanes A-B. Swim lanes provide protection against priority inversion and denial of service. Each of components 630, 641-642, 651-652, 661-662, 671-672, and 690 may be a computer or co-locatable software service hosted on a same computer.

7.1 Front Controller

In operation, automation or human administrators such as the DBAs of concurrent administrators 610 may simultaneously submit administrative requests of various kinds to configure the pluggable databases of CDBs 621-623. Concurrent administrators 610 may be more or less unmanaged clients, such as cloud customers, whose point of network presence may be more or less anywhere in the global Internet, shown as the wild 602. Concurrent administrators 610 submit requests to WebLogic broker 630 that may be an edge computer that hosts an web server and/or application server such as a Java enterprise addition (J2EE) server that may occur in an exposed security realm such as a demilitarized zone such as DMZ 601. WebLogic broker 630 may perform intake of administrative requests and may function according to the "front controller" enterprise design pattern. Although WebLogic broker 630 is shown as a single computer, it may instead be a cluster of computers for horizontal scaling of front-end processing. WebLogic broker 630 only minimally processes administrative requests as follows. WebLogic broker 630 may receive and inspect a request (not shown) to detect a category of the request. For example, WebLogic broker 630 may categorize and prioritize requests based on urgency or type of request. For example, WebLogic broker 630 may detect that (urgent) restoration from backup of a pluggable database is requested, or that (eventual) creation of a replica of a pluggable database is requested.

WebLogic broker 630 may impose admission control, such that malformed, unauthorized, or unrealistic administrative requests are discarded. For example, WebLogic broker 630 may reject requests for horizontal scaling by more than a hundred computers. WebLogic broker 630 may impose fine grained permissions, such as with an access control list (ACL) or rules. Thus, WebLogic broker 630 may need to inspect the content, context, and/or provenance of each request. In another embodiment, access/admission control is instead imposed by the agents of pools 641-642, 661-662, or 671-672, or not imposed at all.

7.2 Swim Lanes

WebLogic broker 630 may direct urgent requests into lane A and non-urgent requests into lane B for execution. Each lane may have a series of pools of agents such as threads or executors that implement various processing stages. Thus, lanes A-B may each be a processing pipeline for administrative requests. Because lanes A-B are separate, they operate independently and may have different capacities that may achieve different throughput rates. Thus, lane A may be a fast lane, and lane B may be slow. Cloud 600 may have additional lanes to segregate processing in various ways based on details of received requests. For example, customers may be grouped into lanes. Alternatively, ten different types or categories of requests may feed ten different lanes that process ten different types or categories of asynchronous jobs.

7.3 Thread Pools

Each lane has a series of pools and/or queues that introduce additional buffering and/or asynchrony. For example, lane A has pools 641, 661, and 671 and job queue 651. The capacity of a lane may be configured by sizing and placement of the pools of the lanes. For example, producer pool 641 (and lane A) may achieve twice as much throughput as producer pool 642 (and lane B) by having twice as a many agents/threads or by being hosted on a computer that is twice as fast. For maximum responsiveness, WebLogic broker 630 delegates initial processing of a request to an agent of the producer pool of a selected lane, thereby facilitating WebLogic broker 630 to process subsequent requests more or less immediately. For example, WebLogic broker 630 may detect that a request need not be fulfilled until tomorrow. Thus, WebLogic broker 630 may select slow lane B and dispatch the request to an idle producer agent in producer pool 642. Each agent within a pool may be busy or idle, which may determine the agent's availability for accepting a next request to execute. WebLogic broker 630 (or one of its threads) may wait until a producer agent becomes available in whichever producer pool is selected.

A producer agent (not shown) generates a configuration/job descriptor (not shown) from the given request and appends the job descriptor onto the job queue of the same lane. For example, the job queues of all of the lanes may be part of central container database 690, such as JMS queues. Central container database 690 may contain database objects or other resources, such as tables 681-682 and template pluggable databases 683, that facilitate job tracking. For example, each enqueued job descriptor may be associated with a row within job table 681. Job table 681 may record the status (e.g. pipeline stage) and lane of each job, such as for job tracking or job cancelation. Job queues 651-652: a) store administrative backlog of cloud 600, b) can absorb more or less any demand spike, and c) help throttle how much administrative workload do CDBs 621-623 sustain. Consumer pools 661-662 de-queue job descriptors from respective job queues 651-652 for execution. Thus, consumer pools 661-662 may impose further admission control and throttling of administrative workload of the PoDs. Protecting the PoDs from an administrative spike may help keep the PoDs lively (available) for analytic and transactional use (i.e. actual live production use).

An available consumer agent within a consumer pool such as 661 may de-queue and execute a job descriptor from job queue 651. The consumer agent may select, inspect (to detect requirements), and/or retrieve a pluggable database template from template pluggable databases 683 that reside in central container database 690. The consumer agent may also consult hosting map table 682 to select current and/or potential hosts for a pluggable database and to discover capacities of those hosts. Thus, the consumer agent may obtain from the job descriptor or from central container database 690 most or all of the information needed to decide which PoDs are involved with the administrative job.

7.4 Fanout

The consumer agent may decompose the job into various tasks, such as tasks local to particular PoDs, and delegate those tasks to respective worker agents of a worker pool, such as 671. Thus, one administrative request may be handled by one producer agent, one consumer agent, and multiple concurrent worker agents. Whereas, worker agents may perform the actual work of executing the administrative changes to a pluggable database needed to fulfil an administrative request.

7.5 Throughput

Lanes and pools offer various systemic advantages. For example, a high-impact demand spike to lane B need not impact the throughput of lane A. Thus for example, a flurry of low-priority database backup requests assigned to lane B need not delay an urgent request in lane A. Thus, cloud 600 is protected from priority inversion (that could cause a denial of service). The thread pool and executor classes of java.utl.concurrent package may be used to implement components shown herein having various forms of configurable asynchrony. In an embodiment, thread pools are dynamically resizable, such that tuning of live cloud 600 can dynamically adjust throughput and priority of lane(s). Cloud 600 may have heuristics for automatic tuning of pool(s) or lane(s) of pools. Cloud 600 may be interactively tuned.

8.0 Director

Figure 7:
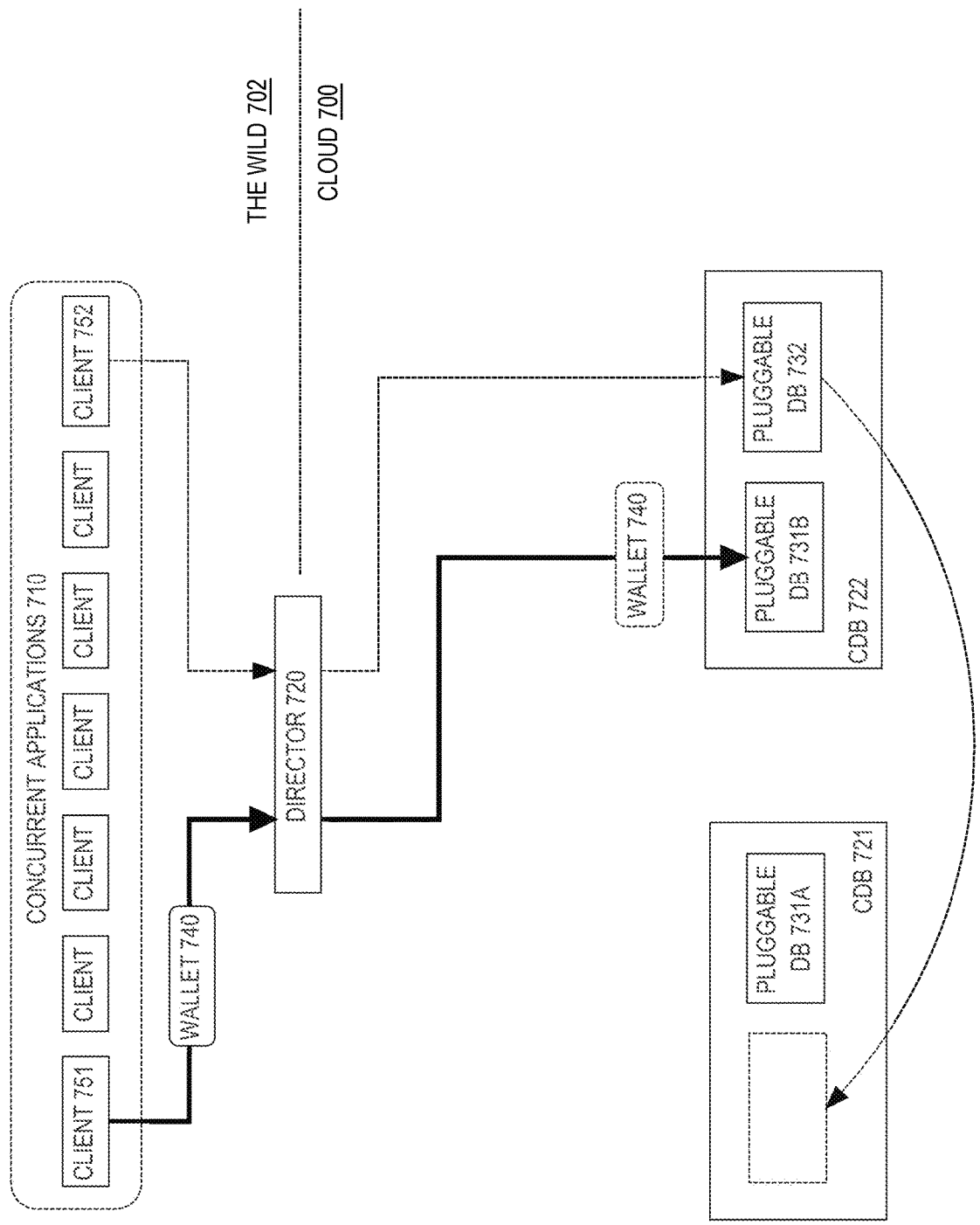
FIG. 7 is a block diagram that depicts an example cloud that has a load balancer that securely routes non-administrative database traffic to relocated pluggable databases, in an embodiment.

FIG. 7 is a block diagram that depicts an example cloud 700, in an embodiment. Cloud 700 has a director that securely routes non-administrative (e.g. OLAP or online transaction processing, OLTP) database traffic to pluggable databases that may or may not have been relocated. Cloud 700 may be an implementation of cloud 100. Cloud 700 contains CDBs 721-722 whose pluggable databases may move to other PoD(s) per administrative request(s). Director 720 hides such movement of pluggable databases from their concurrent client applications 710, including clients such 751-752. Concurrent applications 710 may: a) identify and connect to a pluggable database without knowing the database's location (hosting information) and, in an embodiment, b) stay connected even though the database moves from one container database, PoD, and or computer to another. For example, client 752 may connect to pluggable database 732 through director 720 using a Java database connectivity (JDBC) connection uniform resource locator (URL) that contains an identifier of pluggable database 732.

Responsive to receiving the URL during an attempt by client 752 to connect to pluggable database 732, director 720 may: a) extract the identifier of pluggable database 732 from the URL, b) consult a lookup table or hosting catalog to detect that pluggable database 732 resides on CDB 722, and c) establish a network connection between client 752 and pluggable database 732 on CDB 722. While connected, client 752 may use DML to analyze or transact with pluggable database 732. If pluggable database 732 moves to CDB 721 while client 752 is connected to pluggable database 732, then director 720 may sustain the connection by reestablishing the connection to pluggable database 732 at CDB 721 instead of CDB 722. Director 720 may perform such connection reestablishment more or less transparent to client 752. Thus, the location of pluggable database 732 may be entirely virtualized. Director 720 may be implemented by a load balancer, router, proxy, or other internet device.

8.1 Wallet

In an embodiment, some or all network traffic from a client, such as 751, may need authentication. Wallet 740 is an authentication credential (e.g. an encryption key, key ring, certificate, or digital signature such as an XML signature) that client 751 may include in a header (e.g. HTTP cookie or other header field) or body of a message to a pluggable database such as 731B. Director 720, CDB 722 (or its computer), or pluggable database 731B (or its container database) may inspect wallet 740 to detect its validity or the identity of client 751. In embodiments, wallet 740 may also be used as a credential for authorization (e.g. fine grained access control), billing/metering/accounting, and routing. For example if wallet 740 was issued for pluggable database 731B only, then director 720 may: a) discover an association between wallet 740 and pluggable database 731B, and b) route all traffic bearing wallet 740 to pluggable database 731B. In an embodiment, each pluggable database generates a wallet for each authorized client. For example, pluggable database 731B generates wallet 740 for client 751. In an embodiment, wallet generation is an administrative request suited for asynchronous execution as described herein. In an embodiment, director 720 relays wallet 740 to pluggable database 731B. In another embodiment, load balancer 740 discards wallet 740 before relaying traffic to pluggable database 731B.

8.2 Data Partitions

Also shown is pluggable database 731A that may store one data partition, and pluggable database 731B may store another partition of a same distributed pluggable database. Director 720 may need client 751 to identify a pluggable database instance, such as 731B, when connecting or include within DML a WHERE clause having value(s) that fall within a partition range for a partition key of column(s) of a table. For example, client 751 may: a) need to know that a purchase table is partitioned by a date column, and b) need to specify a clause such as "WHERE when='7/29/2017'" in a query, but need not know: c) whether partitioning is by day or year, and d) which pluggable database instance has which data partition. In an embodiment, repartitioning is an administrative request suited for asynchronous execution as described herein. In an embodiment, cloud 700 uses director 720 and range-based data partitioning to hide repartitioning from clients.

9.0 Database System Overview

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

10.0 Pluggable Database and Container Database System Overview

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database objects included in each PDB. Further, each pluggable database includes a PDB-specific database dictionary that comprises metadata that defines database objects contained in the pluggable database. Database objects include tables, table columns, indexes, files, tablespaces, data types, users, user privileges, and storage structures used for storing database object data, etc.

A container database may manage multiple pluggable databases and a given database server instance may manage and serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A given container database is configured based on the requirements of those database management system (DBMS) features that are applicable to the container database. A DBMS feature that is applicable to a container database is one that interacts with or influences the container database and, as such, requires a certain configuration of the container database. DBMS features that may be applicable to a given container database, comprise one or more of: a version of the DBMS that manages the container database (including major version, minor version, and/or patch level); optional features that may be installed or implemented for a container database (such as data encryption, a feature that allows multiple levels of data restriction within areas of the database, localization enablement); common users that exist in the container database; independently-installed patches that have been installed for the DBMS that manages the container database; etc.

The configuration of a CDB encompasses aspects of the CDB that are adjusted based on the DBMS features that are applicable to the CDB. Such aspects of the CDB comprise one or more of: data stored within or the structure of the database objects stored in the pluggable databases of the CDB; the layout or content of the underlying operating system files of the CDB; the number of background processes required by the CDB; identifiers associated with the CDB; variables required for CDB functionality; initialization parameters; a character set with which data in the CDB is encoded; time zones supported by the CDB; standard database block size; tablespace settings; undo settings; services supported by the CDB; special features implemented for the CDB; database server instance cluster support for the CDB; etc.

Pluggable databases may be "plugged in" to a container database, and may be transported between database servers and/or database management systems. A database server instance plugs a pluggable database into a container database by including metadata describing the pluggable database in the database dictionary of the container database and by initiating management of the pluggable database as part of the container database. Any number of the aspects of the configuration of a container database, into which a particular pluggable database is plugged, affects the pluggable database.

When a pluggable database is moved to a destination container database from a source container database, where the destination and source container databases have the same configuration, the pluggable database need not be reconfigured prior to making the pluggable database available to operations at the destination container database. However, the source and destination container databases of a relocating pluggable database are not always configured for the same set of DBMS features. When a pluggable database is moved to a destination container database that has a different configuration than the source container database of the pluggable database, the relocated pluggable database is reconfigured to conform to the configuration of the destination container database, which allows the relocated pluggable database to be compatible with the DBMS features that are applicable to the destination container database.

11.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
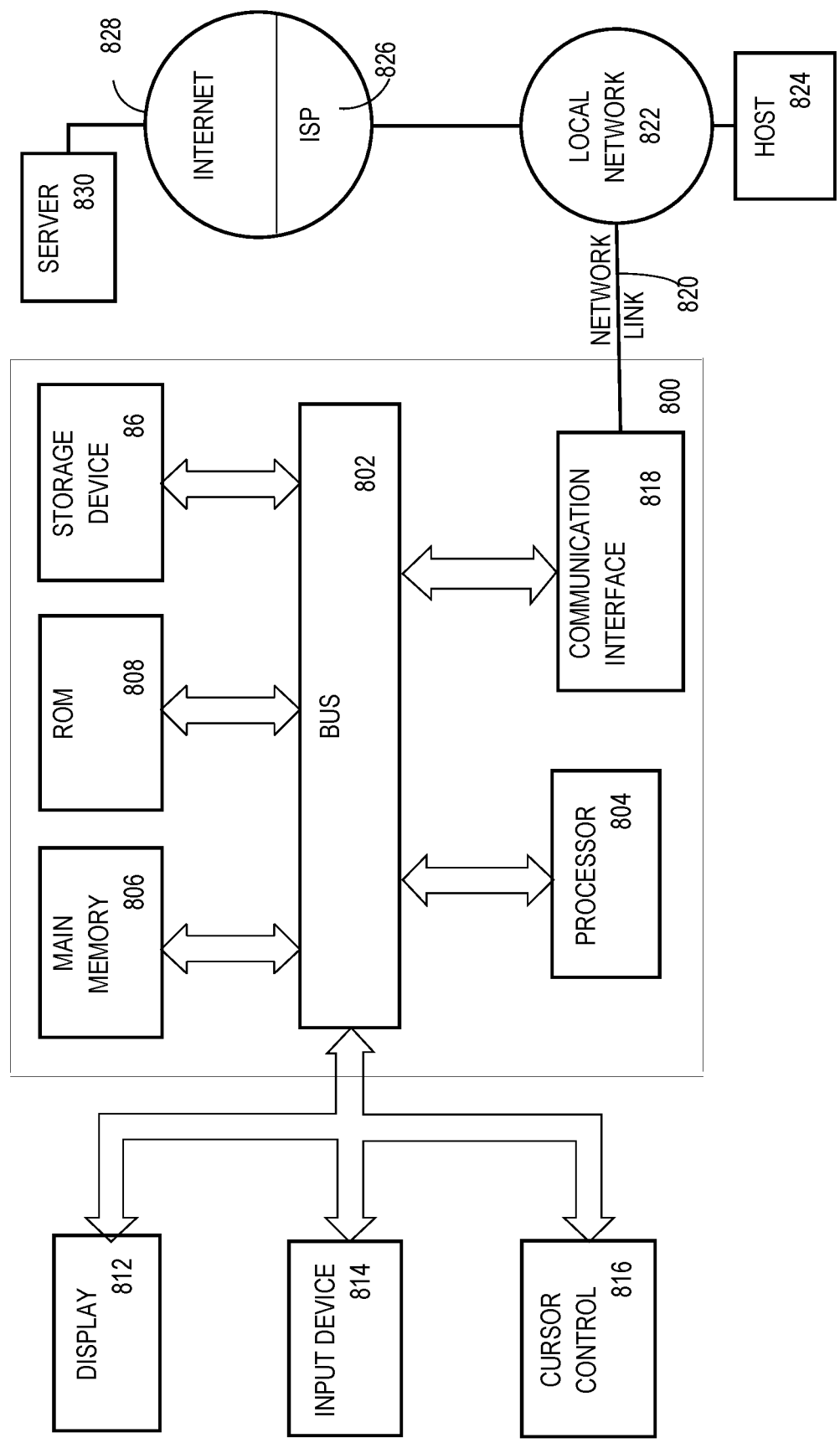
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 86, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 86. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 86. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 86 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 86, or other non-volatile storage for later execution.

12.0 Software Overview

Figure 9:
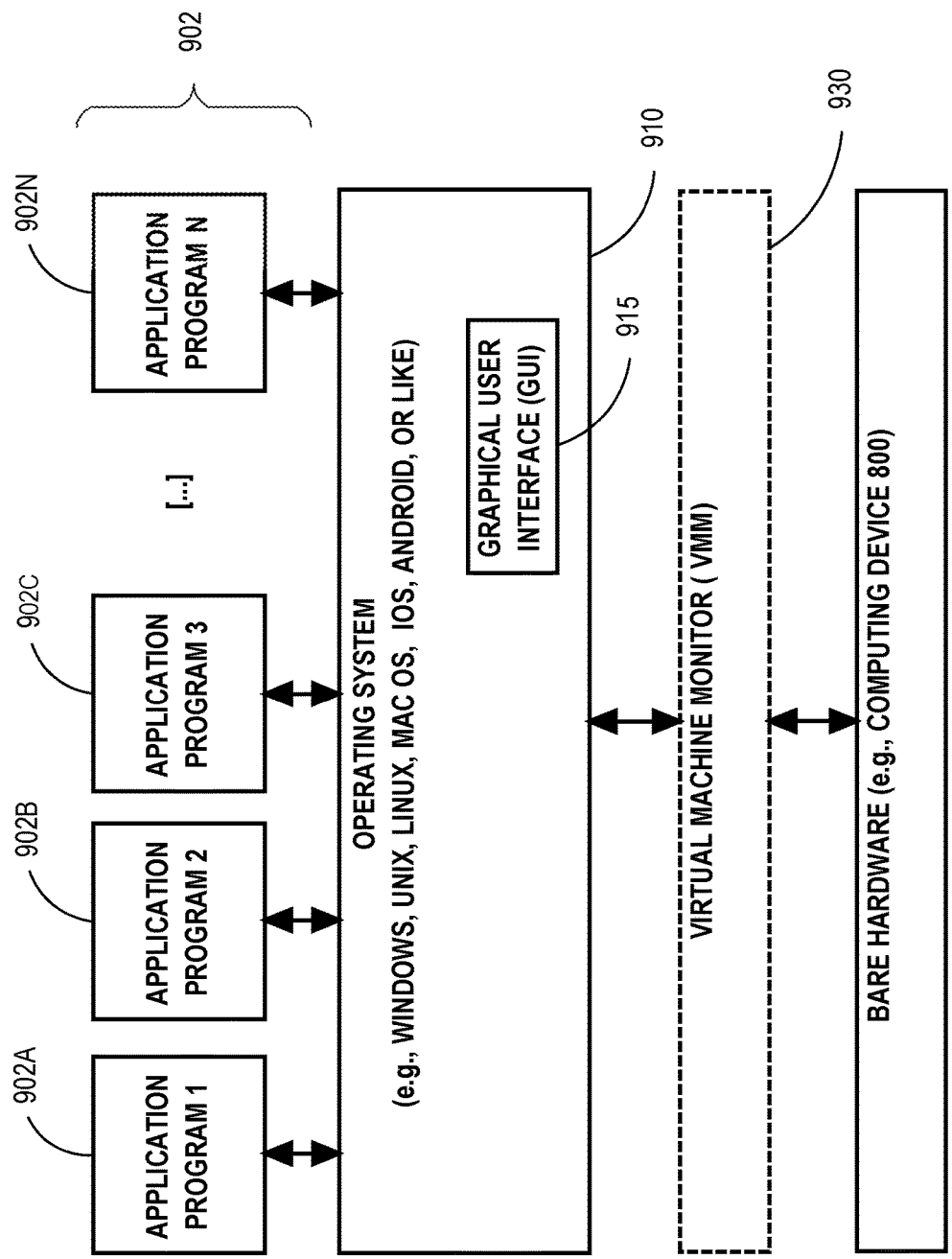
FIG. 9 is a block diagram that illustrates a basic software system that may be employed for controlling the operation of a computing system.

FIG. 9 is a block diagram of a basic software system 900 that may be employed for controlling the operation of computing system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing system 800. Software system 900, which may be stored in system memory (RAM) 806 and on fixed storage (e.g., hard disk or flash memory) 86, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 86 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 900 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

13.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving an administrative request that indicates configuration details for a pluggable database;
   generating a configuration descriptor that specifies an asynchronous job based on the configuration details of the administrative request;
   accessing hosting metadata to detect a target container database that will host the pluggable database but does not currently host the pluggable database;
   executing the asynchronous job to configure the pluggable database based on at least one selected from the group consisting of the hosting metadata and the configuration descriptor.

2. The method of claim 1 wherein:
   generating the configuration descriptor occurs on a first computer;
   a second computer hosts at least one selected from the group consisting of: a) a current container database that already hosts the pluggable database and b) the target container database;
   executing the asynchronous job occurs on a third computer.

3. The method of claim 1 wherein executing the asynchronous job comprises invoking a remote application programming interface (API) to invoke a stored procedure in at least one selected from the group consisting of: the pluggable database and a current container database that already hosts the pluggable database.

4. The method of claim 1 wherein:
   the configuration descriptor comprises a particular job type of a plurality of job types;
   the method further comprises:
      automatically selecting a particular job queue of a plurality of job queues based on the particular job type, and
      automatically appending the asynchronous job onto the particular job queue.

5. The method of claim 1 wherein the configuration details of the administrative request comprise a symbolic name of the pluggable database.

6. The method of claim 5 wherein:
   the method further comprises automatically selecting a particular template from a plurality of pluggable templates based on the symbolic name;
   executing the asynchronous job comprises creating the pluggable database as an instance of the particular template.

7. The method of claim 1 wherein:
   the method further comprises automatically selecting the target container database;
   executing the asynchronous job comprises moving the pluggable database from a current container database that already hosts the pluggable database to the target container database.

8. The method of claim 7 wherein said administrative request is automatically generated in response to detecting a dynamic condition.

9. The method of claim 8 wherein the dynamic condition comprises an observed amount of at least one selected from the group consisting of: resource usage and resource availability.

10. The method of claim 7 wherein the current container database and the target container database have different release versions.

11. The method of claim 7 further comprising a director performing:
    directing, to the current container database, a first query that identifies a pluggable database;
    directing, to the target container database, a second query that identifies said pluggable database.

12. The method of claim 11 wherein a same client issues the first query and the second query.

13. The method of claim 11 wherein the director authenticates a client that issues the first query.

14. The method of claim 1 wherein executing the asynchronous job causes generating a second request that includes deployment reconfiguration details for at least one selected from the group consisting of: said pluggable database and a second pluggable database.

15. The method of claim 1 wherein the asynchronous job generates an authentication wallet.

16. The method of claim 1 wherein receiving the administrative request comprises synchronously returning at least one selected from the group consisting of: a computational future and a smart stub.

17. The method of claim 1 wherein said accessing the hosting metadata comprises accessing, to detect the target container database that will host the pluggable database but does not currently host the pluggable database, at least one selected from the group consisting of: a lookup table, a database table, a referential data structure, a map, and a network service.

18. A method comprising:
receiving an administrative request that indicates configuration details for a pluggable database, wherein the configuration details of the administrative request comprise:
  a first specified amount of a resource, and
  a second specified amount of at least one selected from the group consisting of:
    processors, processor cores, threads, and parallelism;
automatically adjusting the first specified amount based on the second specified amount;
generating a configuration descriptor that specifies an asynchronous job based on the configuration details of the administrative request;
accessing hosting metadata to detect at least one selected from the group consisting of:
  a current container database that already hosts the pluggable database, and
  a target container database that will host the pluggable database;
executing the asynchronous job to configure the pluggable database based on at least one selected from the group consisting of the hosting metadata and the configuration descriptor.

19. One or more non-transitory computer-readable media storing instructions that, when executed by one or more processors, cause:
receiving an administrative request that indicates configuration details for a pluggable database;
generating a configuration descriptor that specifies an asynchronous job based on the configuration details of the administrative request;
accessing hosting metadata to detect a target container database that will host the pluggable database but does not currently host the pluggable database;
executing the asynchronous job to configure the pluggable database based on at least one selected from the group consisting of the hosting metadata and the configuration descriptor.

20. The one or more non-transitory computer-readable media of claim 19 wherein:
deployment reconfiguration details comprise a particular job type of a plurality of job types;
the instructions, when executed by the one or more processors, further cause:
  automatically selecting a particular job queue of a plurality of job queues based on the particular job type, and
  automatically appending the asynchronous job onto the particular job queue.

21. The one or more non-transitory computer-readable media of claim 19 wherein:
the configuration details of the administrative request comprise a symbolic name of the pluggable database;
the instructions, when executed by the one or more processors, further cause automatically selecting a particular template from a plurality of pluggable templates based on the symbolic name;
executing the asynchronous job comprises creating the pluggable database as an instance of the particular template.

22. The one or more non-transitory computer-readable media of claim 19 wherein:
generating the configuration descriptor occurs on a first computer;
a second computer hosts at least one selected from the group consisting of: a) a current container database that already hosts the pluggable database and b) the target container database;
executing the asynchronous job occurs on a third computer.

23. The one or more non-transitory computer-readable media of claim 19 wherein executing the asynchronous job comprises invoking a remote application programming interface (API) to invoke a stored procedure in at least one selected from the group consisting of: the pluggable database and a current container database that already hosts the pluggable database.

24. The one or more non-transitory computer-readable media of claim 19 wherein:
the instructions, when executed by the one or more processors, further cause automatically selecting the target container database;
executing the asynchronous job comprises moving the pluggable database from a current container database that already hosts the pluggable database to the target container database.

25. The one or more non-transitory computer-readable media of claim 24 wherein said administrative request is automatically generated in response to detecting a dynamic condition.

26. The one or more non-transitory computer-readable media of claim 25 wherein the dynamic condition comprises an observed amount of at least one selected from the group consisting of: resource usage and resource availability.

27. The one or more non-transitory computer-readable media of claim 24 wherein the current container database and the target container database have different release versions.

28. The one or more non-transitory computer-readable media of claim 24 the instructions, when executed by the one or more processors, further cause a director to perform:
directing, to the current container database, a first query that identifies a pluggable database;
directing, to the target container database, a second query that identifies said pluggable database.

29. The one or more non-transitory computer-readable media of claim 28 wherein a same client issues the first query and the second query.

30. The one or more non-transitory computer-readable media of claim 28 wherein the instructions, when executed by the one or more processors, further cause the director to authenticate a client that issues the first query.

31. The one or more non-transitory computer-readable media of claim 19 wherein executing the asynchronous job causes generating a second request that includes deployment reconfiguration details for at least one selected from the group consisting of: said pluggable database and a second pluggable database.

32. The one or more non-transitory computer-readable media of claim 19 wherein the instructions, when executed by the one or more processors, further cause the asynchronous job to generate an authentication wallet.

33. The one or more non-transitory computer-readable media of claim 19 wherein receiving the administrative request comprises synchronously returning at least one selected from the group consisting of: a computational future and a smart stub.

34. The one or more non-transitory computer-readable media of claim 19 wherein said accessing the hosting metadata comprises accessing, to detect the target container database that will host the pluggable database but does not currently host the pluggable database, at least one selected from the group consisting of: a lookup table, a database table, a referential data structure, a map, and a network service.

35. One or more non-transitory computer-readable media storing instructions that, when executed by one or more processors, cause:
   receiving an administrative request that indicates configuration details for a pluggable database, wherein the configuration details of the administrative request comprise:
      a first specified amount of a resource, and
      a second specified amount of at least one selected from the group consisting of: processors, processor cores, threads, and parallelism;
   automatically adjusting the first specified amount based on the second specified amount;
   generating a configuration descriptor that specifies an asynchronous job based on the configuration details of the administrative request;
   accessing hosting metadata to detect at least one selected from the group consisting of:
      a current container database that already hosts the pluggable database, and
      a target container database that will host the pluggable database;
   executing the asynchronous job to configure the pluggable database based on at least one selected from the group consisting of the hosting metadata and the configuration descriptor.

* * * * *

UNITED STATES PATENT AND TRADEMARK OFFICE
CERTIFICATE OF CORRECTION

PATENT NO. : 11,327,932 B2
APPLICATION NO. : 16/055468
DATED : May 10, 2022
INVENTOR(S) : Hung et al.

It is certified that error appears in the above-identified patent and that said Letters Patent is hereby corrected as shown below:

On the Title Page

On page 4, Column 1, Item (56) under Other Publications, Line 2, delete "Indexex" and insert -- Indexes --, therefor.

On page 4, Column 1, Item (56) under Other Publications, Line 48, delete "theTenth" and insert -- the Tenth --, therefor.

On page 4, Column 2, Item (56) under Other Publications, Line 62, delete "aService"," and insert -- a-Service", --, therefor.

On page 4, Column 2, Item (56) under Other Publications, Line 71, delete "Allownace," and insert -- Allowance, --, therefor.

On page 5, Column 1, Item (56) under Other Publications, Line 30, delete "FInal" and insert -- Final --, therefor.

On page 5, Column 2, Item (56) under Other Publications, Line 13, delete "Restrcition" and insert -- Restriction --, therefor.

In the Specification

In Column 11, Line 33, after "15/266,902" insert -- . --, therefor.

In Column 15, Line 38, delete "and or" and insert -- and/or --, therefor.

Signed and Sealed this
Sixteenth Day of August, 2022

Katherine Kelly Vidal
*Director of the United States Patent and Trademark Office*

In the Claims

In Column 23, Lines 60-61, in Claim 2, delete "computer ." and insert -- computer. --, therefor.

In Column 26, Line 36, in Claim 28, delete "the" and insert -- wherein the --, therefor.